US009888243B2

(12) United States Patent
Zhou et al.

(10) Patent No.: US 9,888,243 B2
(45) Date of Patent: Feb. 6, 2018

(54) QUANTIZATION MATRIX COMPRESSION IN VIDEO CODING

(71) Applicant: TEXAS INSTRUMENTS INCORPORATED, Dallas, TX (US)

(72) Inventors: Minhua Zhou, San Diego, CA (US); Vivienne Sze, Cambridge, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 317 days.

(21) Appl. No.: 14/886,028

(22) Filed: Oct. 17, 2015

(65) Prior Publication Data

US 2016/0100169 A1  Apr. 7, 2016

Related U.S. Application Data

(63) Continuation of application No. 13/305,560, filed on Nov. 28, 2011, now Pat. No. 9,167,252.
(Continued)

(51) Int. Cl.
*H04N 7/12* (2006.01)
*H04N 19/124* (2014.01)
(Continued)

(52) U.S. Cl.
CPC ....... *H04N 19/124* (2014.11); *H04L 65/4069* (2013.01); *H04L 65/607* (2013.01);
(Continued)

(58) Field of Classification Search
CPC .. H04N 19/124; H04N 19/105; H04N 19/117; H04N 19/126; H04N 19/176; H04N 19/184; H04N 19/463; H04N 19/59; H04N 19/60; H04N 19/61; H04N 19/85; H04N 19/4069; H04N 19/607
See application file for complete search history.

(56) References Cited

U.S. PATENT DOCUMENTS 5,280,343 A  1/1994 Sullivan
5,832,120 A  11/1998 Prabhaker et al.
(Continued)

OTHER PUBLICATIONS

Minhua Zhou and Vivienne Sze, "Further Study on Compact Representation of Quantization Matrices", JCTVC-F085, Jul. 14-22, 2011, pp. 1-4, Joint Collaborative Team on Video Coding (JCT-VC) of ITU-T SG16 WP3 and ISO/IEC JTC1/SC29/WG11, Torino, Italy.
(Continued)

*Primary Examiner* — Nhon Diep
(74) *Attorney, Agent, or Firm* — Peter K. McLarty; Charles A. Brill; Frank D. Cimino

(57) ABSTRACT

A method of quantization matrix compression in a video encoder is provided that includes preprocessing a quantization matrix by performing at least one selected from downsampling the quantization matrix and imposing 135 degree symmetry on the quantization matrix, performing zigzag scanning on the pre-processed quantization matrix to generate a one dimensional (1D) sequence, predicting the 1D sequence to generate a residual 1D sequence, and coding the residual 1D sequence using kth order exp-Golomb coding to generate a compressed quantization matrix, wherein k≥0.

17 Claims, 10 Drawing Sheets

Related U.S. Application Data

(60) Provisional application No. 61/550,797, filed on Oct. 24, 2011, provisional application No. 61/494,312, filed on Jun. 7, 2011, provisional application No. 61/418,537, filed on Dec. 1, 2010.

(51) Int. Cl.

| | | |
|---|---|---|
| *H04N 19/105* | (2014.01) | |
| *H04N 19/61* | (2014.01) | |
| *H04N 19/463* | (2014.01) | |
| *H04N 19/126* | (2014.01) | |
| *H04N 19/85* | (2014.01) | |
| *H04N 19/59* | (2014.01) | |
| *H04N 19/117* | (2014.01) | |
| *H04N 19/176* | (2014.01) | |
| *H04N 19/60* | (2014.01) | |
| *H04N 19/184* | (2014.01) | |
| *H04L 29/06* | (2006.01) | |

(52) U.S. Cl.
CPC ......... *H04N 19/105* (2014.11); *H04N 19/117* (2014.11); *H04N 19/126* (2014.11); *H04N 19/176* (2014.11); *H04N 19/184* (2014.11); *H04N 19/463* (2014.11); *H04N 19/59* (2014.11); *H04N 19/60* (2014.11); *H04N 19/61* (2014.11); *H04N 19/85* (2014.11)

(56) References Cited

U.S. PATENT DOCUMENTS

| | | | |
|---|---|---|---|
| 7,254,533 B1 | 8/2007 | Jabri et al. | |
| 7,464,394 B1 * | 12/2008 | Gordon | H04N 21/4344 |
| | | | 725/39 |
| 7,502,743 B2 * | 3/2009 | Thumpudi | G10L 19/008 |
| | | | 704/500 |
| 7,933,327 B2 * | 4/2011 | Lu | H04N 19/159 |
| | | | 375/240.03 |
| 2005/0047667 A1 | 3/2005 | Ju | |
| 2005/0175099 A1 | 8/2005 | Sarkijarvi et al. | |
| 2009/0220163 A1 | 9/2009 | Wu | |
| 2011/0051811 A1 | 3/2011 | Wang et al. | |
| 2013/0114695 A1 | 5/2013 | Joshi | |
| 2014/0177728 A1 | 6/2014 | Zhang et al. | |

OTHER PUBLICATIONS

Minhua Zhou and Vivienne Sze, "CE4: Test Results on Compact Representation of Quantization Matrices", JCTVC-G083, Nov. 19-30, 2011, pp. 1-5, Joint Collaborative Team on Video Coding (JCT-VC) of ITU-T SG16 WP3 and ISO/IEC JTC1/SC29/WG11, Geneva, Switzerland.

Minhua Zhou and Vivienne Sze, "Non-CE4: Carnage of Large Block Size Quantization Matrices with Up-Sampling", JCTVC-G094, Nov. 19-30, 2011, pp. 1-6, Joint Collaborative Team on Video Coding (JCT-VC) of ITU-T SG16 WP3 and ISO/IEC JTC1/SC29/WG11, Geneva, Switzerland.

Minhua Zhou and Vivienne Sze, "Compact Representation of Quantization Matrices for HEVC", JCTVC-D024, Jan. 20-28, 2011, pp. 1-9, Joint Collaborative Team on Video Coding (JCT-VC) of ITU-T SG16 WP3 and ISO/IEC JTC1/SC29/WG11, Daegu, Korea.

Thomas Wiegand et al, "WD1: Working Draft 1 of High-Efficiency Video Coding", JCTVC-C403, Oct. 7-15, 2010, pp. 1-137, Joint Collaborative Team on Video Coding (JCT-VC) of ITU-T SG16 WP3 and ISO/IEC JTC1/SC29/WG11, Guangzhou, China.

"Advanced Video Coding for Generic Audiovisual Services", Series H: Audiovisual and Multimedia Systems, Infrastructure of Audio Visual Services—Coding of Moving Video, ITU-T Recommendation H.264, Telecommunication Standardization Sector of ITU, Mar. 2005, pp. 1-343.

* cited by examiner

QUANTIZATION MATRIX COMPRESSION IN VIDEO CODING

CROSS-REFERENCE TO RELATED APPLICATIONS

This application is a continuation of application Ser. No. 13/305,560, filed Nov. 28, 2011, which claims benefit of U.S. Provisional Patent Application Ser. No. 61/418,537, filed Dec. 1, 2010, U.S. Provisional Patent Application Ser. No. 61/494,312, filed Jun. 7, 2011, and U.S. Provisional Patent Application Ser. No. 61/550,797, filed Oct. 24, 2011, which are incorporated herein by reference in their entirety.

BACKGROUND OF THE INVENTION

Field of the Invention

Embodiments of the present invention generally relate to compression of quantization matrices in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

In general, current video encoders break a picture into discrete blocks (e.g., 4×4 or 8×8) that are transformed into blocks of coefficients. Each block is then quantized by multiplying by a quantization scale and dividing element-wise by a quantization matrix. The video coding standard supported by a video encoder defines default quantization matrices for the supported transform block sizes and may also allow custom matrices to be used. If custom matrices are used, the matrices are compressed and transmitted in the coded bit stream for use in decoding.

Future video encoding standards such as the High Efficiency Video Coding (HEVC) standard currently under development by a Joint Collaborative Team on Video Coding (JCT-VC) established by the ISO/IEC Moving Picture Experts Group (MPEG) and ITU-T Video Coding Experts Group (VCEG) may support larger transform sizes (e.g., 16×16 and 32×32) in addition to the smaller transform sizes of the current standards in order to improve coding efficiency. Thus, quantization matrices of the same sizes will also be needed. If quantization matrices vary from picture to picture, significant overhead to transmit the quantization matrices will be incurred if current compression techniques are used.

SUMMARY

Embodiments of the present invention relate to methods and apparatus for compression of quantization matrices in video coding. In one aspect, a method of compressing quantization matrices in a video encoder includes preprocessing a quantization matrix by performing at least one selected from down-sampling the quantization matrix and imposing 135 degree symmetry on the quantization matrix, performing zigzag scanning on the pre-processed quantization matrix to generate a one dimensional (1D) sequence, predicting the 1D sequence to generate a residual 1D sequence, and coding the residual 1D sequence using kth order exp-Golomb coding to generate a compressed quantization matrix, wherein k≥0.

In one aspect, a method of decompressing a compressed quantization matrix in a video decoder includes decoding a coded residual one dimensional (1D) sequence using kth order exp-Golomb coding to generate a reconstructed 1D residual sequence, wherein k≥0, performing inverse prediction on the reconstructed 1D residual sequence to generate a reconstructed 1D sequence, performing inverse zigzag scanning on the reconstructed 1D sequence to generate a reconstructed quantization matrix, and postprocessing the reconstructed quantization matrix by performing at least one selected from up-sampling the reconstructed quantization matrix and applying 135 degree symmetry processing to the reconstructed quantization matrix.

In one aspect, a method of processing a compressed video bit stream in a video decoder includes receiving a compressed quantization matrix, decompressing the compressed reference quantization matrix to generate a first reconstructed quantization matrix, and up-sampling the first reconstructed quantization matrix to generate a second reconstructed quantization matrix larger than the first reconstructed quantization matrix. The method may further include up-sampling the second reconstructed quantization matrix to generate a third reconstructed quantization matrix larger than the second reconstructed quantization matrix.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
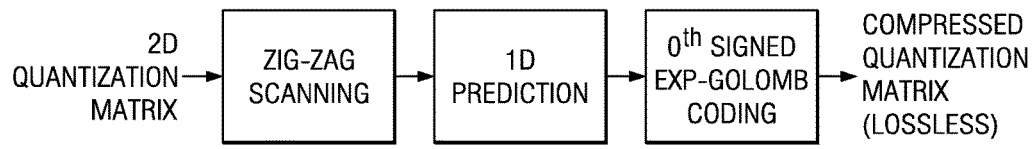
FIG. 1 is a flow diagram illustrating the H.264 quantization matrix compression method.

Specific embodiments of the invention will now be described in detail with reference to the accompanying figures. Like elements in the various figures are denoted by like reference numerals for consistency.

For convenience of description, embodiments of the invention are described herein in reference to the October 2010 draft specification for HEVC. The 2010 draft specification is entitled "WD1: Working Draft 1 of High-Efficiency Video Coding" and is identified as document number JCT-VC_C403. One of ordinary skill in the art will understand that embodiments of the invention are not limited to this draft specification or to HEVC.

Some aspects of this disclosure have been presented to the JCT-VC in the following documents: JCTVC-D024, entitled "Compact Representation of Quantization Matrices for HEVC", Jan. 20-28, 2011, JCTVC-F085, entitled "Further Study on Compact Representation of Quantization Matrices", Jul. 14-22, 2011, and JCTVC-0083, entitled "CE4: Test Results on Compact Representation of Quantization Matrices", Nov. 19-30, 2011. These documents are incorporated by reference herein in their entirety.

As used herein, the term "picture" refers to a frame or a field of a frame. A frame is a complete image captured during a known time interval. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

FIG. 1 illustrates the technique used to compress quantization matrices transmitted in the sequence parameter set (SPS) and picture parameter set (PPS) in the predecessor to HEVC, H.264/MPEG-4 AVC, referred to as H.264 herein. H.264 is a video coding standard developed by the International Telecommunication Union (ITU) Telecommunication Standardization Sector (ITU-T) Video Coding Experts Group (VCEG) together with the ISO/IEC Moving Picture Experts Group (MPEG). The ITU-T H.264 standard and the ISO/IEC MPEG-4 AVC standard (formally, ISO/IEC 14496-10-MPEG-4 Part 10, Advanced Video Coding) are jointly maintained so that they have identical technical content.

As shown in FIG. 1, the compression technique takes a two-dimensional (2D) quantization matrix as input. Initially, zigzag scanning is performed to convert the 2D matrix into a one-dimensional (1D) sequence. Then, 1D sample prediction is performed to create a 1D residual sequence. Finally, signed $0^{th}$ order exp-Golomb coding is performed on the 1D residual sequence to generate the compressed output. Note that the compression is lossless.

H.264 supports 4×4 and 8×8 transform block sizes. Six 4×4 quantization matrices are defined for the 4×4 block size, i.e., 3 matrices for inter-coded Y, Cb, Cr components and three matrices for intra-coded Y, Cb, Cr components. Two 8×8 quantization matrices are defined for the 8×8 block size, i.e., a matrix for intra-coded Y components and a matrix for inter-coded Y components. As currently defined, HEVC supports four transform block sizes, 4×4, 8×8, 16×16, and 32×32, and six quantization matrices for each block size, i.e., for each block size, there are 3 matrices for inter-coded Y, Cb, Cr components and three matrices for intra-coded Y, Cb, Cr components. If the H.264 technique for compressing quantization matrices is used for HEVC, significant overhead will be incurred to include these matrices in a picture parameter set (PPS) or a sequence parameter set (SPS).

In general, an SPS is a set of parameters to be applied to a video sequence and a PPS is a set of parameters to be applied to one or more consecutive pictures in a video sequence. In both H.264 and HEVC, if quantization matrices other than those default matrices defined by the standard are to be used at the sequence level, the matrices are compressed and inserted the coded bit stream at the SPS level. Similarly, if quantization matrices other than those default matrices defined by the standard or at the sequence level are to be used for one or more consecutive pictures, the matrices are compressed and inserted in the coded bit stream at the PPS level.

Table 1 is a comparison of the overhead of including the H.264 compressed quantization matrices in a parameter set to the overhead of including the HEVC compressed quantization matrices in a parameter set assuming the H.264 quantization matrix compression technique of FIG. 1. The quantization matrices of Tables 2-5 are used for this comparison. Table 2 is an example 4×4 quantization matrix, Table 3 is an example 8×8 quantization matrix, Table 4 is an example 16×16 quantization matrix, and Table 5 is an example 32×32 quantization matrix. The second column of Table 1 shows the number of bits in the respective compressed quantization matrices, fourth column shows the total number of bits assuming the 8 quantization matrices of H.264, and the sixth column shows the total number of bits assuming the 24 quantization matrices of HEVC. Note that total number of bits for HEVC is more than a 10× increase over that of H.264.

TABLE 1

| Quantization matrix block size | Number of bits | Number of quantization matrices in H.264 | Total bits for quantization matrices in H.264 | Number of quantization matrices in HEVC | Total bits for quantization matrices in HEVC |
|---|---|---|---|---|---|
| 4 × 4 | 140 | 6 | 1528 | 6 | 16584 |
| 8 × 8 | 344 | 2 | | 6 | |
| 16 × 16 | 702 | 0 | | 6 | |
| 32 × 32 | 1578 | 0 | | 6 | |

TABLE 2

| 8, | 20, | 68, | 80, |
| 20, | 56, | 92, | 152, |
| 68, | 92, | 140, | 164, |
| 80, | 152, | 164, | 188, |

TABLE 3

| 8, | 11, | 23, | 26, | 50, | 53, | 89, | 92, |
| 11, | 20, | 29, | 47, | 56, | 86, | 95, | 134, |
| 23, | 29, | 44, | 59, | 83, | 98, | 131, | 137, |
| 26, | 47, | 59, | 80, | 101, | 128, | 140, | 167, |
| 50, | 56, | 83, | 101, | 125, | 143, | 164, | 170, |
| 53, | 86, | 98, | 128, | 143, | 161, | 173, | 188, |
| 89, | 95, | 131, | 140, | 164, | 173, | 185, | 191, |
| 92, | 134, | 137, | 167, | 170, | 188, | 191, | 197, |

TABLE 4

| 8, | 8, | 11, | 12, | 18, | 19, | 28, | 29, | 41, | 41, | 56, | 57, | 75, | 76, | 97, | 98, |
| 8, | 11, | 13, | 17, | 20, | 27, | 29, | 40, | 42, | 56, | 58, | 74, | 77, | 96, | 98, | 120, |
| 11, | 13, | 17, | 20, | 26, | 30, | 39, | 43, | 55, | 59, | 74, | 77, | 95, | 99, | 119, | 121, |

TABLE 4-continued

| | | | | | | | | | | | | | | | |
|---|---|---|---|---|---|---|---|---|---|---|---|---|---|---|---|
| 12, | 17, | 20, | 26, | 31, | 38, | 44, | 54, | 59, | 73, | 78, | 95, | 100, | 119, | 122, | 140, |
| 18, | 20, | 26, | 31, | 38, | 44, | 53, | 60, | 72, | 79, | 94, | 101, | 118, | 122, | 140, | 141, |
| 19, | 27, | 30, | 38, | 44, | 53, | 61, | 71, | 80, | 93, | 101, | 117, | 123, | 139, | 142, | 158, |
| 28, | 29, | 39, | 44, | 53, | 61, | 71, | 80, | 92, | 102, | 116, | 124, | 138, | 143, | 157, | 158, |
| 29, | 40, | 43, | 54, | 60, | 71, | 80, | 92, | 103, | 116, | 125, | 137, | 143, | 156, | 159, | 172, |
| 41, | 42, | 55, | 59, | 72, | 80, | 92, | 103, | 115, | 125, | 137, | 144, | 155, | 160, | 171, | 173, |
| 41, | 56, | 59, | 73, | 79, | 93, | 102, | 116, | 125, | 136, | 145, | 155, | 161, | 170, | 173, | 183, |
| 56, | 58, | 74, | 78, | 94, | 101, | 116, | 125, | 137, | 145, | 154, | 161, | 170, | 174, | 182, | 184, |
| 57, | 74, | 77, | 95, | 101, | 117, | 124, | 137, | 144, | 155, | 161, | 169, | 175, | 182, | 185, | 191, |
| 75, | 77, | 95, | 100, | 118, | 123, | 138, | 143, | 155, | 161, | 170, | 175, | 181, | 185, | 191, | 192, |
| 76, | 96, | 99, | 119, | 122, | 139, | 143, | 156, | 160, | 170, | 174, | 182, | 185, | 190, | 193, | 197, |
| 97, | 98, | 119, | 122, | 140, | 142, | 157, | 159, | 171, | 173, | 182, | 185, | 191, | 193, | 196, | 197, |
| 98, | 120, | 121, | 140, | 141, | 158, | 158, | 172, | 173, | 183, | 184, | 191, | 192, | 197, | 197, | 199, |

TABLE 5

| | | | | | | | | | | | | | | | |
|---|---|---|---|---|---|---|---|---|---|---|---|---|---|---|---|
| 8, | 8, | 8, | 9, | 10, | 10, | 13, | 13, | 16, | 16, | 20, | 20, | 24, | 25, | 30, | 30, |
| 36, | 36, | 43, | 43, | 51, | 51, | 59, | 59, | 68, | 68, | 78, | 78, | 89, | 89, | 100, | 101, |
| 8, | 8, | 9, | 10, | 11, | 12, | 13, | 16, | 16, | 20, | 20, | 24, | 25, | 30, | 30, | 36, |
| 36, | 43, | 43, | 50, | 51, | 59, | 59, | 68, | 69, | 78, | 79, | 89, | 89, | 100, | 101, | 112, |
| 8, | 9, | 10, | 11, | 12, | 13, | 15, | 16, | 19, | 20, | 24, | 25, | 29, | 30, | 36, | 37, |
| 43, | 44, | 50, | 51, | 59, | 60, | 68, | 69, | 78, | 79, | 89, | 89, | 100, | 101, | 112, | 112, |
| 9, | 10, | 11, | 12, | 13, | 15, | 17, | 19, | 20, | 24, | 25, | 29, | 31, | 35, | 37, | 42, |
| 44, | 50, | 51, | 59, | 60, | 68, | 69, | 78, | 79, | 88, | 90, | 100, | 101, | 112, | 113, | 123, |
| 10, | 11, | 12, | 13, | 15, | 17, | 19, | 21, | 24, | 25, | 29, | 31, | 35, | 37, | 42, | 44, |
| 50, | 52, | 58, | 60, | 68, | 69, | 77, | 79, | 88, | 90, | 100, | 101, | 112, | 113, | 123, | 123, |
| 10, | 12, | 13, | 15, | 17, | 19, | 21, | 23, | 26, | 29, | 31, | 35, | 37, | 42, | 44, | 50, |
| 52, | 58, | 60, | 67, | 69, | 77, | 79, | 88, | 90, | 99, | 101, | 111, | 113, | 123, | 124, | 134, |
| 13, | 13, | 15, | 17, | 19, | 21, | 23, | 26, | 29, | 31, | 35, | 37, | 42, | 44, | 50, | 52, |
| 58, | 60, | 67, | 70, | 77, | 80, | 88, | 90, | 99, | 102, | 111, | 113, | 123, | 124, | 133, | 134, |
| 13, | 16, | 16, | 19, | 21, | 23, | 26, | 29, | 31, | 35, | 38, | 42, | 44, | 49, | 52, | 58, |
| 61, | 67, | 70, | 77, | 80, | 88, | 90, | 99, | 102, | 111, | 113, | 122, | 124, | 133, | 134, | 143, |
| 16, | 16, | 19, | 20, | 24, | 26, | 29, | 31, | 35, | 38, | 41, | 45, | 49, | 52, | 58, | 61, |
| 67, | 70, | 77, | 80, | 87, | 91, | 99, | 102, | 111, | 113, | 122, | 124, | 133, | 134, | 143, | 143, |
| 16, | 20, | 20, | 24, | 25, | 29, | 31, | 35, | 38, | 41, | 45, | 49, | 53, | 57, | 61, | 67, |
| 70, | 77, | 80, | 87, | 91, | 99, | 102, | 111, | 114, | 122, | 124, | 133, | 134, | 143, | 143, | 152, |
| 20, | 20, | 24, | 25, | 29, | 31, | 35, | 38, | 41, | 45, | 49, | 53, | 57, | 61, | 66, | 70, |
| 76, | 80, | 87, | 91, | 98, | 102, | 110, | 114, | 122, | 125, | 133, | 134, | 143, | 144, | 152, | 152, |
| 20, | 24, | 25, | 29, | 31, | 35, | 37, | 42, | 45, | 49, | 53, | 57, | 61, | 66, | 71, | 76, |
| 80, | 87, | 91, | 98, | 103, | 110, | 114, | 122, | 125, | 132, | 135, | 142, | 144, | 152, | 152, | 160, |
| 24, | 25, | 29, | 31, | 35, | 37, | 42, | 44, | 49, | 53, | 57, | 61, | 66, | 71, | 76, | 81, |
| 87, | 91, | 98, | 103, | 110, | 114, | 122, | 125, | 132, | 135, | 142, | 144, | 151, | 152, | 160, | 160, |
| 25, | 30, | 30, | 35, | 37, | 42, | 44, | 49, | 52, | 57, | 61, | 66, | 71, | 76, | 81, | 86, |
| 92, | 98, | 103, | 110, | 114, | 121, | 125, | 132, | 135, | 142, | 144, | 151, | 153, | 160, | 160, | 167, |
| 30, | 30, | 36, | 37, | 42, | 44, | 50, | 52, | 58, | 61, | 66, | 71, | 76, | 81, | 86, | 92, |
| 98, | 103, | 110, | 115, | 121, | 125, | 132, | 135, | 142, | 144, | 151, | 153, | 159, | 161, | 167, | 167, |
| 30, | 36, | 37, | 42, | 44, | 50, | 52, | 58, | 61, | 67, | 70, | 76, | 81, | 86, | 92, | 98, |
| 103, | 110, | 115, | 121, | 125, | 132, | 135, | 142, | 145, | 151, | 153, | 159, | 161, | 167, | 168, | 174, |
| 36, | 36, | 43, | 44, | 50, | 52, | 58, | 61, | 67, | 70, | 76, | 80, | 87, | 91, | 98, | 103, |
| 109, | 115, | 121, | 126, | 131, | 136, | 141, | 145, | 151, | 153, | 159, | 161, | 167, | 168, | 174, | 174, |
| 36, | 43, | 44, | 50, | 52, | 58, | 60, | 67, | 70, | 77, | 80, | 87, | 91, | 98, | 103, | 110, |
| 115, | 121, | 126, | 131, | 136, | 141, | 145, | 150, | 153, | 159, | 161, | 167, | 168, | 173, | 174, | 180, |
| 43, | 43, | 50, | 51, | 58, | 60, | 67, | 70, | 77, | 80, | 87, | 91, | 98, | 103, | 110, | 115, |
| 121, | 126, | 131, | 136, | 141, | 145, | 150, | 154, | 159, | 161, | 166, | 168, | 173, | 174, | 179, | 180, |
| 43, | 50, | 51, | 59, | 60, | 67, | 70, | 77, | 80, | 87, | 91, | 98, | 103, | 110, | 115, | 121, |
| 126, | 131, | 136, | 141, | 145, | 150, | 154, | 158, | 161, | 166, | 168, | 173, | 175, | 179, | 180, | 185, |
| 51, | 51, | 59, | 60, | 68, | 69, | 77, | 80, | 87, | 91, | 98, | 103, | 110, | 114, | 121, | 125, |
| 131, | 136, | 141, | 145, | 150, | 154, | 158, | 162, | 166, | 169, | 173, | 175, | 179, | 180, | 185, | 185, |
| 51, | 59, | 60, | 68, | 69, | 77, | 80, | 88, | 91, | 99, | 102, | 110, | 114, | 121, | 125, | 132, |
| 136, | 141, | 145, | 150, | 154, | 158, | 162, | 166, | 169, | 173, | 175, | 179, | 180, | 184, | 185, | 189, |
| 59, | 59, | 68, | 69, | 77, | 79, | 88, | 90, | 99, | 102, | 110, | 114, | 122, | 125, | 132, | 135, |
| 141, | 145, | 150, | 154, | 158, | 162, | 166, | 169, | 173, | 175, | 179, | 181, | 184, | 185, | 189, | 189, |
| 59, | 68, | 69, | 78, | 79, | 88, | 90, | 99, | 102, | 111, | 114, | 122, | 125, | 132, | 135, | 142, |
| 145, | 150, | 154, | 158, | 162, | 166, | 169, | 172, | 175, | 179, | 181, | 184, | 185, | 189, | 189, | 193, |
| 68, | 69, | 78, | 79, | 88, | 90, | 99, | 102, | 111, | 114, | 122, | 125, | 132, | 135, | 142, | 145, |
| 151, | 153, | 159, | 161, | 166, | 169, | 173, | 175, | 178, | 181, | 184, | 186, | 188, | 190, | 192, | 193, |
| 68, | 78, | 79, | 88, | 90, | 99, | 102, | 111, | 113, | 122, | 125, | 132, | 135, | 142, | 144, | 151, |
| 153, | 159, | 161, | 166, | 169, | 173, | 175, | 179, | 181, | 184, | 186, | 188, | 190, | 192, | 193, | 195, |
| 78, | 79, | 89, | 90, | 100, | 101, | 111, | 113, | 122, | 124, | 133, | 135, | 142, | 144, | 151, | 153, |
| 159, | 161, | 166, | 168, | 173, | 175, | 179, | 181, | 184, | 186, | 188, | 190, | 192, | 193, | 195, | 196, |
| 78, | 89, | 89, | 100, | 101, | 111, | 113, | 122, | 124, | 133, | 134, | 142, | 144, | 151, | 153, | 159, |
| 161, | 167, | 168, | 173, | 175, | 179, | 181, | 184, | 186, | 188, | 190, | 192, | 193, | 195, | 196, | 197, |
| 89, | 89, | 100, | 101, | 112, | 113, | 123, | 124, | 133, | 134, | 143, | 144, | 151, | 153, | 159, | 161, |
| 167, | 168, | 173, | 175, | 179, | 180, | 184, | 185, | 188, | 190, | 192, | 193, | 195, | 196, | 197, | 198, |
| 89, | 100, | 101, | 112, | 113, | 123, | 124, | 133, | 134, | 143, | 144, | 152, | 152, | 160, | 161, | 167, |
| 168, | 173, | 174, | 179, | 180, | 184, | 185, | 189, | 190, | 192, | 193, | 195, | 196, | 197, | 198, | 199, |
| 100, | 101, | 112, | 113, | 123, | 124, | 133, | 134, | 143, | 143, | 152, | 152, | 160, | 160, | 167, | 168, |

TABLE 5-continued

| | | | | | | | | | | | | | | | |
|---|---|---|---|---|---|---|---|---|---|---|---|---|---|---|---|
| 174, | 174, | 179, | 180, | 185, | 185, | 189, | 189, | 192, | 193, | 195, | 196, | 197, | 198, | 199, | 199, |
| 101, | 112, | 112, | 123, | 123, | 134, | 134, | 143, | 143, | 152, | 152, | 160, | 160, | 167, | 167, | 174, |
| 174, | 180, | 180, | 185, | 185, | 189, | 189, | 193, | 193, | 195, | 196, | 197, | 198, | 199, | 199, | 199, |

Embodiments of the invention provide for compression of quantization matrices to reduce the number of bits needed to represent the compressed matrices. Further, unlike the H.264 technique, lossy compression may be performed. More specifically, in some embodiments, zigzag scanning is performed on a quantization matrix that may be optionally pre-processed by down-sampling, 135 degree symmetry processing, and/or 45 degree symmetry processing. After the zigzag scanning, in some embodiments, one of 1D prediction for signed exp-Golomb coding, 1D prediction for unsigned exp-Golomb coding, or matrix prediction from a reference matrix may be selectively performed, followed by signed or unsigned kth order exp-Golomb coding as appropriate to generate the final compressed quantization matrix. In some embodiments, rather than compressing large block size quantization matrices, e.g., 16×16 and 32×32 quantization matrices, and encoding them in the compressed video bit stream, such matrices may be derived from up-sampling smaller quantization matrices.

Further, the matrix compression may be performed in a manner that is backward compatible with H.264. That is, for 4×4 and 8×8 matrices, if none of the preprocessing is performed, the zigzag scanning is the same as that of the H.264 compression technique and the option of 1D prediction for signed exp-Golomb coding following by signed $0^{th}$ order exp-Golomb coding may be selected. However, example embodiments of the quantization matrix compression described herein differ from that of the H.264 matrix compression in several respects. For example, the use of signed or unsigned kth order exp-Golomb code for encoding prediction residuals is permitted rather than being restricted to the signed $0^{th}$ order exp-Golomb code, which improves compression efficiency. Further, the options of reducing the compressed matrix size by imposing symmetry along 135 degrees and/or symmetry (with offset) along 45 degrees are provided. The option of down-sampling quantization matrices to further decrease the compression ratio is also provided. Finally, the option of using matrix prediction from other quantization matrices, either the default matrices or matrices that have been previously compressed and transmitted is provided.

Compared to the H.264 quantization matrix compression technique, some embodiments of the quantization matrix compression described herein may provide approximately 7× better compression efficiency with the use of matrix down-sampling, the imposition of symmetry on the quantization matrix along 135 and 45 (with offset) degrees, and the use of the unsigned kth order exp-Golomb code instead of the signed $0^{th}$ order exp-Golomb code. Embodiments provide flexibility for an encoder to choose the desired compression level.

Figure 2:
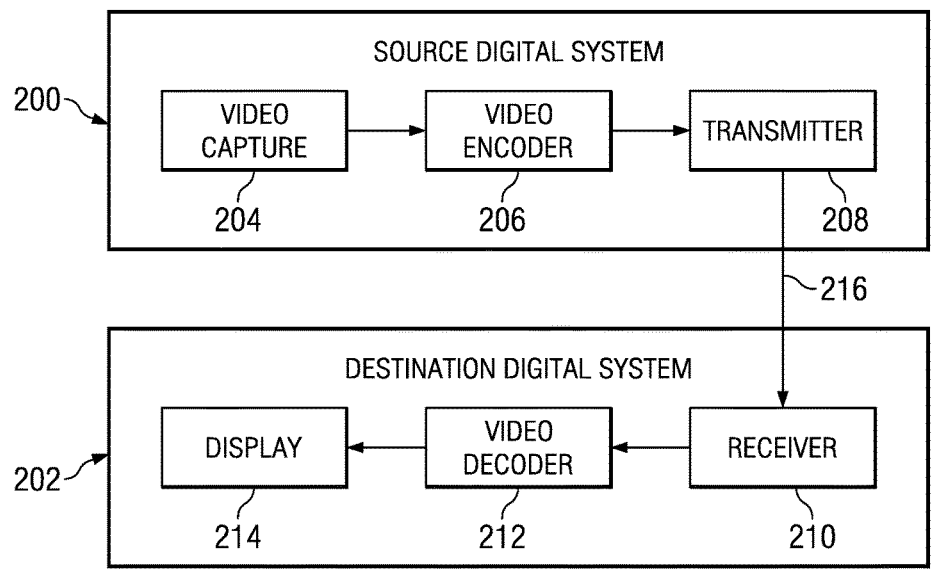
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of frames, divides the frames into largest coding units (LCUs), and encodes the video data in the LCUs. The video encoder component 206 may be configured to apply quantization matrix compression and decompression techniques during the encoding process as described herein. An embodiment of the video encoder component 206 is described in more detail herein in reference to FIGS. 3A and 3B.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to apply quantization matrix decompression techniques during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3A:
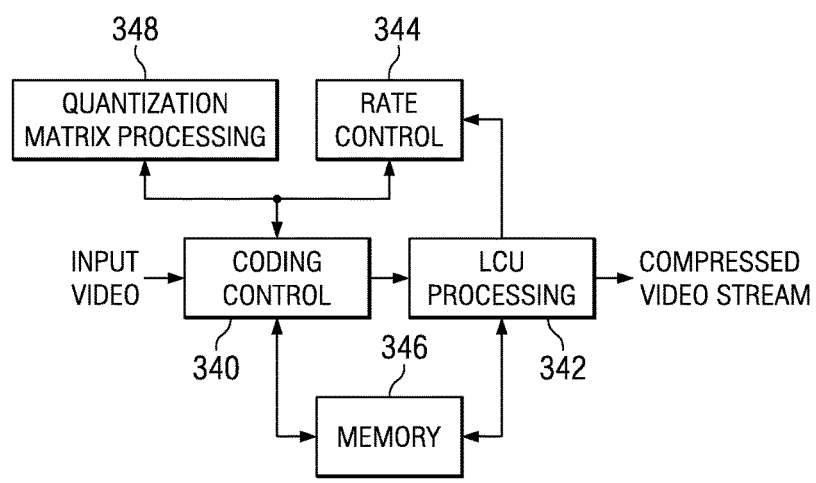
FIGS. 3A and 3B are block diagrams of a video encoder.
Figure 3B:
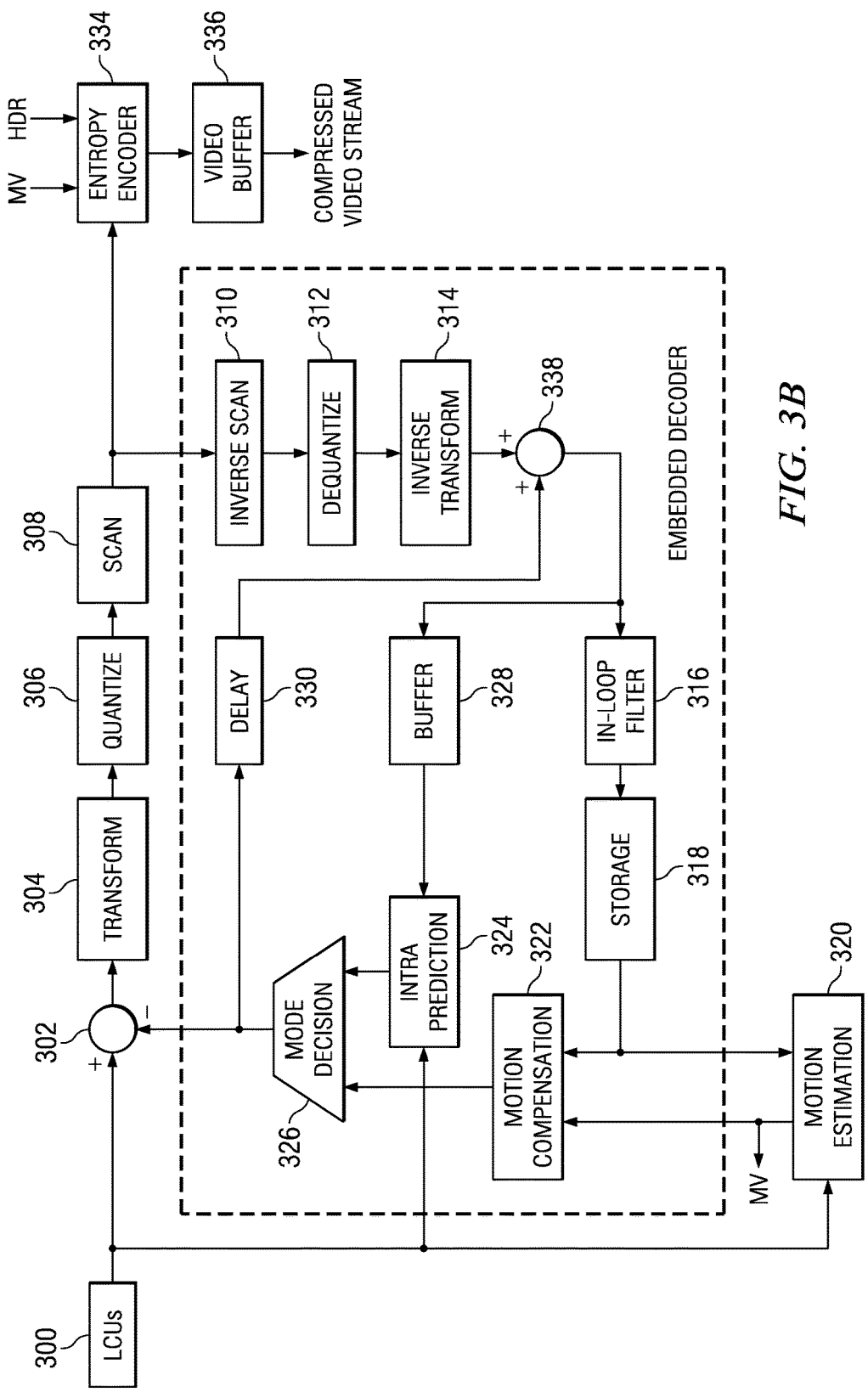

FIGS. 3A and 3B show block diagrams of an example video encoder. FIG. 3A shows a high level block diagram of the video encoder and FIG. 3B shows a block diagram of the LCU processing component 342 of the video encoder. As shown in FIG. 3A, a video encoder includes a coding control component 340, an LCU processing component 342, a rate control component 344, a quantization matrix processing component 348, and a memory 346. The memory 346 may be internal memory, external memory, or a combination thereof.

An input digital video sequence is provided to the coding control component 340. The coding control component 340 sequences the various operations of the video encoder, i.e., the coding control component 340 runs the main control loop for video encoding. For example, the coding control component 340 performs any processing on the input video sequence that is to be done at the frame level, such as determining the coding type (I, P, or B) of a picture based on the high level coding structure, e.g., IPPP, IBBP, hierarchical-B, and dividing a frame into LCUs for further processing. The coding control component 340 also may determine the initial LCU CU structure for each CU and provides information regarding this initial LCU CU structure to the various components of the LCU processing component 342 as needed. The coding control component 340 also may determine the initial PU and TU structure for each CU and provides information regarding this initial structure to the various components of the LCU processing component 342 as needed.

The rate control component 344 determines a quantization scale QS for each CU in a picture based on various rate control criteria and provides the QS to the coding control component 340 for communication to various components of the LCU processing component 342 as needed. The rate control component 344 may use any suitable rate control algorithm.

The quantization matrix processing component 348 provides functionality for compression and decompression of quantization matrices. Compression and decompression of quantization matrices is described below in reference to FIGS. 5-9.

The coding control component 340 determines the quantization matrix to be used for quantizing a transform unit. As was previously mentioned, in HEVC, there are four TU block sizes and 6 default quantization matrices for each TU block size. Further, any or all of these default matrices may be replaced by custom quantization matrices, i.e., non-default quantization matrices at the sequence level and/or at the picture level. At the beginning of a video sequence, the coding control component 340 may determine whether the default quantization matrices are to be used at the sequence level or whether one or more of the sequence level quantization matrices are to be non-default quantization matrices. If one or more non-default quantization matrices are to be used at the sequence level, the coding control component 340 may cause the quantization matrix processing component 348 to compress the one or more matrices for inclusion in the SPS.

Further, the coding control component 340 may also determine whether the sequence level quantization matrices are to be used at the picture level or whether one or more of the picture level quantization matrices are to be different. If one or more quantization matrices different from the sequence level quantization matrices are to be used in encoding of a picture or sequence of pictures, the coding control component 340 may cause the quantization matrix processing component 348 to compress the one or more matrices for inclusion in the PPS for the picture or sequence of pictures.

In some embodiments, rather than compressing a large block size quantization matrix for inclusion in the SPS or a PPS, a convention may be used in which if a smaller, e.g., 8×8, non-default quantization matrix is compressed and included in the SPS or a PPS, the decoder will automatically derive larger, e.g., 16×16 and/or 32×32, quantization matrices of the same type (inter/intra Y, Cr, Cb) from the smaller non-default quantization matrix by up-sampling the smaller quantization matrix. Any suitable technique for selecting the reference quantization matrix may be used.

As is explained in more detail below, if a non-default quantization matrix is to be used for quantization of a TU, a reconstructed version of the matrix may be used rather than the original matrix. This is because the matrix compression process may be lossy. If the encoder uses the original matrix and the decoder uses the reconstructed matrix, there will be a mismatch. Accordingly, if a non-default quantization matrix is to be used for a TU, the coding control component 340 may request a reconstructed quantization matrix from the quantization matrix processing component 348. In some embodiments, the reconstruction may be performed if the compression of the quantization matrix may be lossy and not performed if the compression is lossless.

In some embodiments, the quantization matrix processing component 348 may compress and decompress the non-default quantization matrix to generate the reconstructed quantization matrix, and provides the reconstructed quantization matrix to the coding control component 340 for communication to the quantize component 306 and the dequantize component 312 (see FIG. 3B). In some embodiments, the quantization matrix processing component 348 may store reconstructed quantization matrices in the memory 346 to avoid recreating the matrices each time they are requested. In some embodiments, when the previously mentioned convention to avoid inclusion of large block size quantization matrices in the SPS or a PPS is used, the quantization matrix processing component 340 may up-sample the smaller non-default quantization matrix to generate the reconstructed quantization matrix. An example of up-sampling of quantization matrices is described below in reference to FIGS. 8A-8C.

The LCU processing component 342 receives LCUs of the input video sequence from the coding control component 340 and encodes the LCUs under the control of the coding control component 340 to generate the compressed video stream. The CUs in the CU structure of an LCU may be processed by the LCU processing component 342 in a depth-first Z-scan order.

FIG. 3B shows the basic coding architecture of the LCU processing component 342. The LCUs 300 from the coding control unit 340 are provided as one input of a motion estimation component 320, as one input of an intra prediction component 324, and to a positive input of a combiner 302 (e.g., adder or subtractor or the like). Further, although not specifically shown, the prediction mode of each picture as selected by the coding control component 340 is provided to a mode selector component, and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion estimation information to the motion compensation component 322 and the entropy encoder 334. More specifically, the motion estimation component 320 performs tests on CUs in an LCU based on multiple temporal prediction modes and transform block sizes using reference data from storage 318 to choose the best motion vector(s)/prediction mode based on a coding cost. To perform the tests, the motion estimation component 320 may begin with the CU structure provided by the coding control component 340. The motion estimation component 320 may divide each CU indicated in the CU structure into prediction units according to the unit sizes of prediction modes and into transform units according to the transform block sizes and calculate the coding costs for each prediction mode and transform block size for each CU.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components in the LCU processing component 342 that need the information.

The motion estimation component 320 provides the selected motion vector (MV) or vectors and the selected prediction mode for each inter predicted CU to the motion compensation component 323 and the selected motion vector (MV) to the entropy encoder 334. The motion compensation component 322 provides motion compensated inter prediction information to the mode decision component 326 that includes motion compensated inter predicted CUs, the selected temporal prediction modes for the inter predicted CUs, and corresponding transform block sizes. The coding costs of the inter predicted CUs are also provided to the mode decision component 326.

The intra prediction component 324 provides intra prediction information to the mode decision component 326 that includes intra predicted CUs and the corresponding spatial prediction modes. That is, the intra prediction component 324 performs spatial prediction in which tests based on multiple spatial prediction modes and transform unit sizes are performed on CUs in an LCU using previously encoded neighboring CUs of the picture from the buffer 328 to choose the best spatial prediction mode for generating an intra predicted CU based on a coding cost. To perform the tests, the intra prediction component 324 may begin with the CU structure provided by the coding control component 340. The intra prediction component 324 may divide each CU indicated in the CU structure into prediction units according to the unit sizes of the spatial prediction modes and into transform units according to the transform block sizes and calculate the coding costs for each prediction mode and transform block size for each CU.

For coding efficiency, the intra prediction component 324 may also decide to alter the CU structure by further partitioning one or more of the CUs in the CU structure. That is, when choosing the best prediction modes, in addition to testing with the initial CU structure, the intra prediction component 324 may also chose to divide the larger CUs in the initial CU structure into smaller CUs (within the limits of the recursive quadtree structure), and calculate coding costs at lower levels in the coding hierarchy. If the intra prediction component 324 changes the initial CU structure, the modified CU structure is communicated to other components in the LCU processing component 342 that need the information. Further, the coding costs of the intra predicted CUs and the associated transform block sizes are also provided to the mode decision component 326.

The mode decision component 326 selects between the motion-compensated inter predicted CUs from the motion compensation component 322 and the intra predicted CUs from the intra prediction component 324 based on the coding costs of the CUs and the picture prediction mode provided by the mode selector component. The output of the mode decision component 326, i.e., the predicted CU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted CU from the current CU to provide a residual CU to the transform component 304. The resulting residual CU is a set of pixel difference values that quantify differences between pixel values of the original CU and the predicted CU.

The transform component 304 performs block transforms on the residual CUs to convert the residual pixel values to transform coefficients and provides the transform coefficients to a quantize component 306. The transform component 304 receives the transform block sizes for the residual CUs and applies transforms of the specified sizes to the CUs to generate transform coefficients.

The quantize component 306 quantizes the transform coefficients based on quantization parameters (QPs) and the quantization matrices provided by the coding control component 340 and the transform sizes. The quantized transform coefficients are taken out of their scan ordering by a scan component 308 and arranged by significance, such as, for example, beginning with the more significant coefficients followed by the less significant.

The ordered quantized transform coefficients for a CU provided via the scan component 308 along with header information for the CU are coded by the entropy encoder 334, which provides a compressed bit stream to a video buffer 336 for transmission or storage. The header information may include an indicator of the transform block size used for the CU and the quantization parameter for the CU. The entropy encoder 334 also codes the CU structure of each LCU.

Inside the LCU processing component 342 is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra prediction component 324 and to a filter component 316. The filter component 316 is an in-loop filter which filters the reconstructed frame information and provides filtered reconstructed CUs, i.e., reference data, to the storage component 318.

Figure 4:
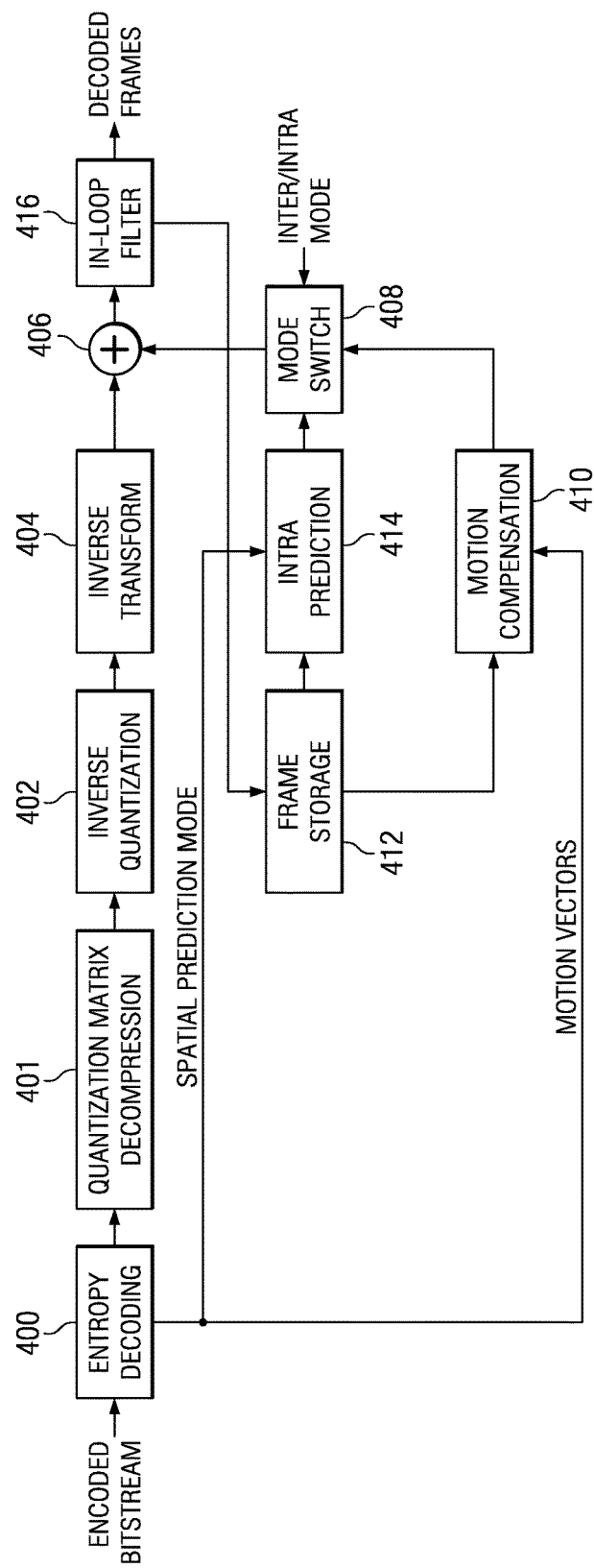
FIG. 4 is a block diagram of a video decoder.

FIG. 4 shows a block diagram of an example video decoder. The video decoder operates to reverse the encoding operations, i.e., entropy coding, quantization, transformation, and prediction, performed by the video encoder of FIGS. 3A and 3B to regenerate the frames of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy coding to recover the encoded CUs and header information such as the quantization parameters, the transform block sizes, compressed quantization matrices (if any), and the encoded CU structures of the LCUs. The quantization matrix decompression component 401 decompresses any compressed quantization matrices to created reconstructed quantization matrices and provides the reconstructed quantization matrices to the inverse quantization component 402. Decompression of compressed quantization matrices is described below in reference to FIGS. 9A and 9B. In some embodiments, a compressed quantization matrix may not be physically present in the compressed bit stream for some large block size quantization matrices. Instead, the quantization matrix decompression component 401 may reconstruct a large block size quantization matrix by up-sampling a smaller non-default quantization matrix. An example of up-sampling of quantization matrices is described below in reference to FIGS. 8A-8C.

The inverse quantization component 402 de-quantizes the quantized transform coefficients of the residual CUs. The inverse transform component 404 transforms the frequency domain data from the inverse quantization component 402 back to residual CUs. That is, the inverse transform component 404 applies an inverse unit transform, i.e., the inverse of the unit transform used for encoding, to the de-quantized residual coefficients to produce the residual CUs.

A residual CU supplies one input of the addition component 406. The other input of the addition component 406 comes from the mode switch 408. When inter-prediction mode is signaled in the encoded video stream, the mode switch 408 selects a prediction unit from the motion compensation component 410 and when intra-prediction is signaled, the mode switch selects a prediction unit from the intra prediction component 414. The motion compensation component 410 receives reference data from storage 412 and applies the motion compensation computed by the encoder and transmitted in the encoded video bit stream to the reference data to generate a predicted CU. The intra-prediction component 414 receives previously decoded predicted CUs from the current picture and applies the intra-prediction computed by the encoder as signaled by a spatial prediction mode transmitted in the encoded video bit stream to the previously decoded predicted CUs to generate a predicted CU.

The addition component 406 generates a decoded CU, by adding the selected predicted CU and the residual CU. The output of the addition component 406 supplies the input of the in-loop filter component 416. The in-loop filter component 416 smoothes artifacts created by the block nature of the encoding process to improve the visual quality of the decoded frame. The output of the in-loop filter component 416 is the decoded frames of the video bit stream. Each decoded CU is stored in storage 412 to be used as reference data.

Figure 5:
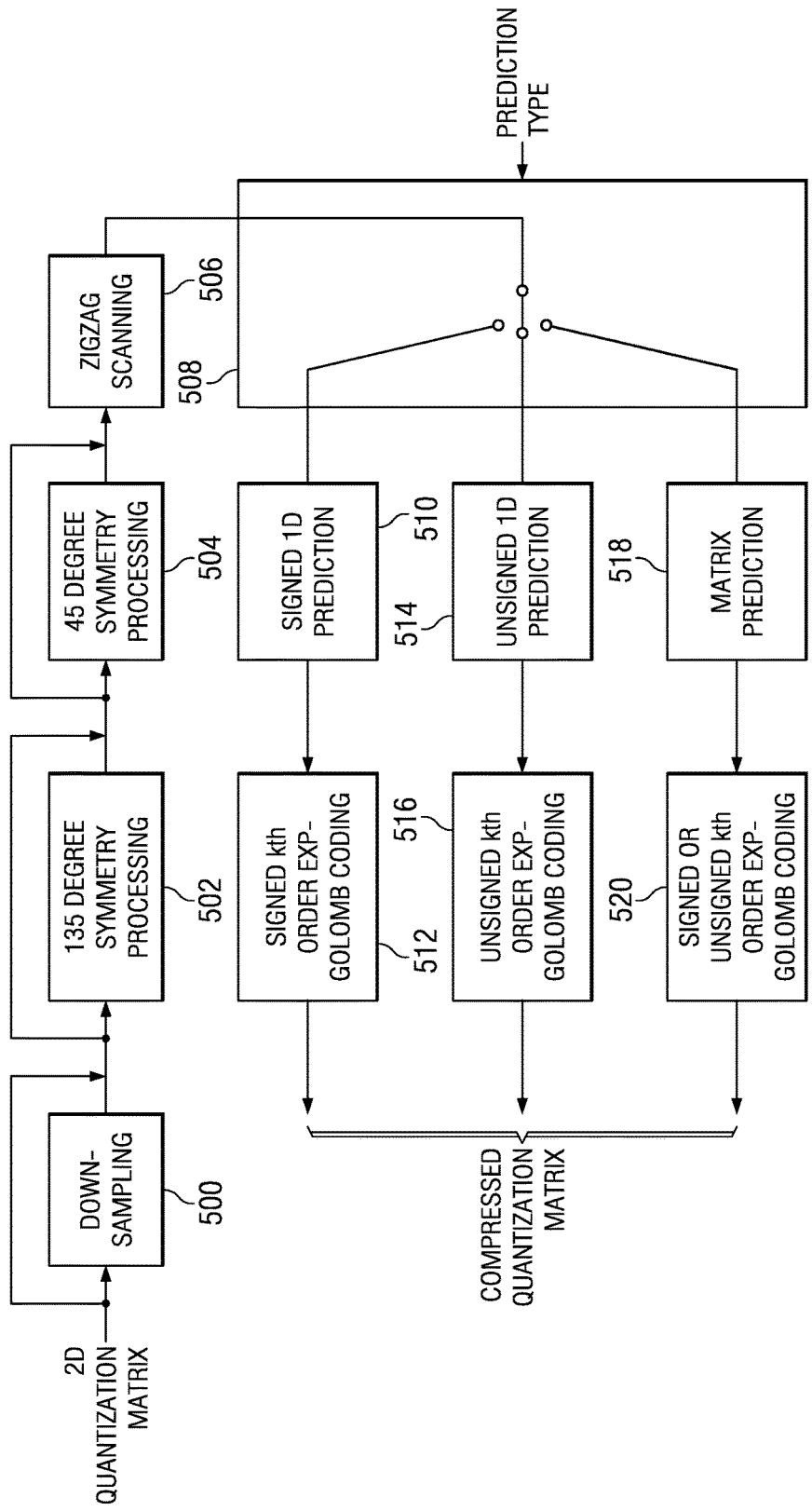
FIG. 5 is a flow diagram of a method for quantization matrix compression.

FIG. 5 shows a flow diagram of a method for compressing a quantization matrix in a video encoder. An embodiment of the method may be performed, for example, by the quantization matrix processing component 348 of FIG. 3. The input to the method is a 2D N×N quantization matrix and the output is a compressed quantization matrix. The description of the method includes example pseudo code illustrating the functionality of various aspects of the method. In this pseudo code, {Qmatx(i, j), for i=0, 1, 2, . . . , N−1, j=0, 1, 2, . . . , N−1} is the N×N quantization matrix.

The method includes three optional preprocessing operations that may be performed on the quantization matrix, down-sampling 500, 135 degree symmetry processing 502, and 45 degree symmetry processing 504. A video encoder may choose to perform none of these operations, any one of these operations, any two of these operations, or all three operations. Any suitable criteria may be used for determining which, if any, of these operations is to be performed.

The down-sampling 500, if performed, down-samples the quantization matrix to reduce the resolution. For example, the N×N quantization matrix may be reduced to (N/2+1)× (N/2+1). Table 6 is pseudo code illustrating the example down-sampling. In this pseudo code, {deciQmatx(i, j), for i=0, 1, 2, . . . , N/2, j=0, 1, 2, . . . , N/2} is the down-sampled quantization matrix. Note that this down-sampling is non-normative.

TABLE 6

```
for (i=0; i< N/2 +1; i++) {
    if (i > 1) row = i*2 −1; else row = i;
    for (j=0; j< N/2 +1; j++) {
        if (j > 1) col = 2*j −1; else col = j;
            deciQMatx(i, j) = Qmatx(row,col); }}
```

The 135 degree symmetry processing 502, if performed, imposes matrix symmetry along 135 degrees, i.e., {Qmatx(i, j)=Qmatx(j, i), for i=0, 1, 2, . . . , N−1, j=0, 1, 2, . . . , N−1} if down-sampling 500 is not performed or {deciQMatx (i, j)=deciQMatx (j, i), for i=0, 1, 2, . . . , (N/2+1)−1, j=0, 1, 2, . . . , (N/2+1)−1} if down-sampling 500 is performed.

The 45 degree symmetry processing 504, if performed, imposes matrix symmetry with an offset along 45 degrees, i.e., {Qmatx(i, j)+Qmatx(N−1−j, N−1−i)=Qsum, for i=0, 1, 2, . . . , N−1, j=0, 1, 2, . . . , N−1} if down-sampling 500 is not performed or {deciQMatx (i, j)+deciQMatx ((N/2+1)− 1−j, (N/2+1)−1−i)=Qsum, for i=0, 1, 2, . . . , (N/2+1)−1, j=0, 1, 2, . . . , (N/2+1)−1} if down-sampling 500 is performed. Qsum is the offset and is constant for the matrix.

The preprocessing performed to compress a quantization matrix needs to be communicated in the encoded bit stream so that a decoder can appropriately reconstruct the quantization matrix. For example, a three bit flag may be used to signal which, if any, of the preprocessing operations were performed. Further, if the 45 degree symmetry processing 504 is performed, the offset used should also be communicated. This offset may be encoded using unsigned kth order exp-Golomb coding.

Zigzag scanning 506 is performed to convert a 2D quantization matrix to a 1D sequence. The quantization matrix at this point may be the original input matrix if none of the preprocessing operations are performed or may be the matrix resulting from performing one or more of the preprocessing operations. Table 7 is example pseudo code for zigzag scanning. In this pseudo code, {zigzagScan(i, j), for i=0, 1, 2, ..., N−1, j=0, 1, 2, ..., N−1} is the N×N zigzag scanning matrix, and {Qmatx1D(i), i=0, 1, 2, N*N−1} is the quantization matrix after zigzag scanning, i.e., the 1D sequence. Note that if either of the symmetry processing operations has been performed, this pseudo code sets those matrix entries that do not need to be encoded due to the imposed symmetry to zero.

TABLE 7

```
for (i= 0; i < N; i++)
    for (j=0; j < N; j++) {
        if (135 degree symmetry processing is enabled && j < i) ||
            (45 degree symmetry processing is enabled && i + j >=N)
            Qmatx1D(zigzagScan[i, j]) =0;
        else
            Qmatx1D(zigzagScan[i, j]) = Qmatx(i, j);}
```

The pseudo code of Table 7 assumes that down-sampling was not performed. If the original N×N matrix was down-sampled, the size of the matrix input to zigzag scanning 506 is (N/2+1)×(N/2+1). For zigzag scanning of the smaller matrix, N is replaced by N/2+1 in the pseudo code. Further, the zigzag scanning matrix zigzagScan(i, j) is of size (N/2+1)×(N/2+1) and the length of the 1D sequence Qmatx1D(i) is (N/2+1)×(N/2+1).

After the zigzag scanning 506, one of three options for predicting and coding the 1D sequence is selected 508 based on a prediction type chosen by the video encoder. Any suitable criteria may be used for determining which of the three options for predicting and coding is to be selected.

Signed 1D prediction 510 creates a 1D residual sequence from the 1D sequence, i.e., Qmatx1D, for signed exp-Golomb coding. Table 8 is pseudo code illustrating the creation of the 1D residual sequence. In this pseudo code, {residual (i), i=0, 1, 2, ..., count−1} is the resulting 1D residual sequence. Note that any zero entries in the 1D sequence are ignored. The resulting 1D residual sequence is then encoded using signed kth order exp-Golomb coding 512 to generate the compressed quantization matrix. The value of k may be determined in any suitable way. Note that in the pseudo code, the variable count stores the number of non-zero values in the 1D residual sequence. This count is needed for the exp-Golomb coding.

TABLE 8

```
Pred = 0; idx = 0;
    For (i = 0; i < N*N; i++)
        If (Qmatx1D[i] !=0) {
            residual[idx] = Qmatx1D[i] − pred;
            pred += residual[idx];
            idx++;
        }
    count = idx;
```

Unsigned 1D prediction 514 creates a 1D residual sequence from the 1D sequence for unsigned exp-Golomb coding. Table 9 is pseudo code illustrating the creation of the 1D residual sequence. In this pseudo code, {residual (i), i=0, 1, 2, ..., count−1} is the resulting 1D residual sequence. In unsigned exp-Golomb coding, all the residuals are required to be 0 or positive. Therefore, the pseudo code of Table 9 forces all negative residuals to 0. Note that any zero entries in the 1D sequence are ignored. The resulting 1D residual sequence is then encoded using unsigned kth order exp-Golomb coding 516 to generate the compressed quantization matrix. The value of k may be determined in any suitable way. Note that in the pseudo code, the variable count stores the number of non-zero values in the 1D residual sequence. This count is needed for the exp-Golomb coding.

TABLE 9

```
Pred = 0; idx = 0;
    For (i = 0; i < N*N; i++)
        If (Qmatx1D[i] !=0) {
            residual[idx] = Qmatx1D[i] − pred;
            if (residual[idx] <0) residual[idx] = 0;
            pred += residual[idx];
            idx++;
        }
    count = idx;
```

Matrix prediction 518 creates a 1D residual sequence from the 1D sequence using a reference quantization matrix. Table 10 is pseudo code illustrating the creation of the 1D residual sequence. In this pseudo code, {residual (i), i=0, 1, 2, ..., count−1} is the resulting 1D residual sequence and {refQmatx(i,j), i=0, 1, 2, ..., N−1, j=0, 1, 2, ..., N−1} is the reference quantization matrix. Note that any zero entries in the 1D sequence are ignored. The resulting 1D residual sequence is then encoded 520 to generate the compressed quantization matrix. Unsigned kth order exp-Golomb coding is used if all the residuals in the sequence are positive and signed kth order exp-Golomb coding is used otherwise. The value of k may be determined in any suitable way.

TABLE 10

```
// convert the reference quantization matrix to zigzag order
    for (i= 0; i < N; i++)
        for (j=0; j < N; j++) {
            refQmatx1D(zigzagScan[i, j]) = refQmatx(i, j)}
// generate residual sequence
    For (i = 0; i < N*N; i++)
        If (Qmatx1D[i] !=0) {
            residual[idx] = Qmatx1D[i] − refQmatx1D[i];
            idx++; }
    count = idx;
```

For the SPS, a reference quantization matrix may be selected from any of the quantization matrices already signaled in the SPS. For example, consider the example SPS format in the pseudo code of Table 11. A possible format for encoding quantization matrices is shown in lines 31-35. In the pseudo code, seq_scaling_matrix_present_flag=0 indicates that the default quantization matrices are used. Otherwise, non-default quantization matrices may be present in SPS. Further, seq_scaling_list_present_flag[i]=0 indicates that a default quantization matrix is used for given scaling list index. Otherwise, a corresponding non-default matrix is included in the SPS. The index i is in the range of [0:23] inclusive. A scaling list is a quantization matrix. Table 12 shows a mapping for purposes of this example of the HEVC scaling lists relative to transform block sizes, scaling list indices, intra/inter coding mode, and Y/CB/CR components.

Referring again to Table 11, scaling_list ( ) is a function which carries the compressed quantization matrix, and ScalingList4×4, ScalingList8×8, ScalingList16×16 and ScalingList32×32 are non-default quantization matrices for transform block sizes 4×4, 8×8, 16×16 and 32×32, respectively. In addition, qmatx_compressionID is a 3-bit flag indicating which of the three preprocessing options, if any, was performed during compression of the scaling list. In this example, the most significant bit signals matrix downsampling, the middle bit signals 45 degree symmetry processing, and the least significant bit signals 135 degree symmetry processing. Finally, log 2_min_transform_block_size_minus2 and log 2_diff_max_min_transform_block_size specify the transform sizes used and determine which of 24 possible non-default quantization matrices are present in SPS.

In this example, if one or more non-default quantization matrices are used, then the SPS will include information for each quantization matrix, whether default or non-default, and the information will be encoded in scaling list index order (see Table 12). As this portion of the SPS is generated and a non-default quantization matrix is compressed for inclusion in the SPS, a reference quantization matrix for matrix prediction may be selected from any of the quantization matrices (default or non-default) already encoded in the SPS, regardless of size. If the selected reference quantization matrix is smaller than the quantization matrix being compressed, the reference quantization matrix is scaled up to the size of the size of the quantization matrix. Any suitable up-sampling technique may be used. For example, the N/2×N/2 to N×N up-sampling technique described below in reference to FIGS. 8A-8C may be used. Any suitable criteria may be used for selection of the reference quantization matrix.

An indication of which matrix was used as the reference quantization matrix is included in the SPS to inform the decoder. This indication may be, for example, the scaling list index of the matrix or the difference between the scaling list index of the quantization matrix and the scaling list index of the reference quantization matrix. The indicator may be encoded with unsigned exp-Golomb code.

Figure 6:
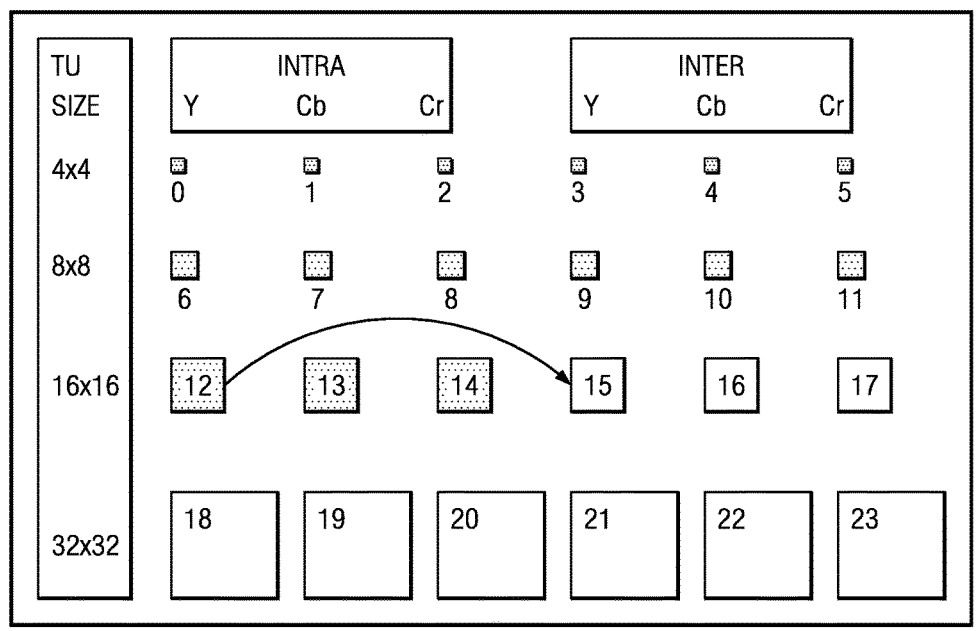
FIGS. 6-8C are examples.

FIG. 6 shows an example of matrix prediction during generation of an SPS. Each of the blocks in this example corresponds to one of the 24 quantization matrices and the index of each matrix is in the corresponding block. The shaded blocks indicate quantization matrices already encoded in the SPS and the unshaded blocks indicate quantization matrices yet to be encoded. Thus, in this example, quantization matrices 0-14 are already encoded and quantization matrix 15, which is assumed to be a non-default matrix, is the matrix currently being compressed using matrix prediction. Any of quantization matrices 0-14 may be used as the reference quantization matrix for quantization matrix 15. In this example, quantization matrix 12 has been selected as the reference quantization matrix. Thus, the reference matrix indicator included in the SPS may be 15−12=3.

TABLE 11

| | | Desc. |
|---|---|---|
| 1 | seq_parameter_set_rbsp( ) { | |
| 2 |     profile_idc | u(8) |
| 3 |     reserved_zero_8bits /* equal to 0 */ | u(8) |
| 4 |     level_idc | u(8) |
| 5 |     seq_parameter_set_id | ue(v) |
| 6 |     pic_width_in_luma_samples | u(16) |
| 7 |     pic_height_in_luma_samples | u(16) |
| 8 |     bit_depth_luma_minus8 | ue(v) |
| 9 |     bit_depth_chroma_minus8 | ue(v) |
| 10 |     log2_max_frame_num_minus4 | ue(v) |
| 11 |     pic_order_cnt_type | ue(v) |
| 12 |     if( pic_order_cnt_type == 0 ) | |
| 13 |         log2_max_pic_order_cnt_lsb_minus4 | ue(v) |
| 14 |     else if( pic_order_cnt_type == 1 ) { | |
| 15 |         delta_pic_order_always_zero_flag | u(1) |
| 16 |         offset_for_non_ref_pic | se(v) |
| 17 |         num_ref_frames_in_pic_order_cnt_cycle | ue(v) |
| 18 |         for( i = 0; i < num_ref_frames_in_pic_order_cnt_cycle; i++ ) | |
| 19 |             offset_for_ref_frame[ i ] | se(v) |
| 20 |     } | |
| 21 |     max_num_ref_frames | ue(v) |
| 22 |     gaps_in_frame_num_value_allowed_flag | u(1) |
| 23 |     log2_min_coding_block_size_minus3 | ue(v) |
| 24 |     log2_diff_max_min_coding_block_size | ue(v) |
| 25 |     log2_min_transform_block_size_minus2 | ue(v) |
| 26 |     log2_diff_max_min_transform_block_size | ue(v) |
| 27 |     max_transform_hierarchy_depth_inter | ue(v) |
| 28 |     max_transform_hierarchy_depth_intra | ue(v) |
| 29 |     adaptive_loop_filter_enabled_flag | u(1) |
| 30 |     cu_qp_delta_enabled_flag | u(1) |
| 31 |     seq_scaling_matrix_present_flag | u(1) |
| 32 |     if( seq_scaling_matrix_present_flag ) | |
| 33 |         for( k = 0; k <= log2_diff_max_min_transform_block_size*6; k++ ) { | |
| 34 |             i = k + log2_min_transform_block_size_minus2*6 | |
| 35 |             If ((i%6) == 0) qmatx_compressionID[i/6] | u(3) |
| 36 |             seq_scaling_list_present_flag[ i ] | u(1) |
| 37 |             if( seq_scaling_list_present_flag[ i ] ) | |
| 38 |                 if( i < 6 ) | |
| 39 |                     scaling_list( ScalingList4x4[ i ], 4, i, 1, qmatx_compressionID[i/6]) | |
| 40 |                 else (i < 12) | |

TABLE 11-continued

| | | Desc. |
|---|---|---|
| 41 | scaling_list( ScalingList8x8[ i − 6 ], 8, i, 1, qmatx_compressionID[i/6]) | |
| 42 | else if (i < 18) | |
| 43 | scaling_list( ScalingList16x16[ i − 12 ], 16, i, 1, qmatx_compressionID[i/6] ) | |
| 44 | else | |
| 45 | scaling_list( ScalingList32x32[ i − 18 ], 32, i, 1, qmatx_compressionID[i/6] ) | |
| 46 | } | |
| 47 | rbsp_trailing_bits( ) | |
| 48 | } | |

TABLE 12

| Transform block size | Intra | | | Inter | | |
|---|---|---|---|---|---|---|
| | Y | Cb | Cr | Y | Cb | Cr |
| 4 × 4 (scaling list index) | ScalingList 4 × 4[0] 0 | ScalingList 4 × 4[1] 1 | ScalingList 4 × 4[2] 2 | ScalingList 4 × 4[3] 3 | ScalingList 4 × 4[4] 4 | ScalingList 4 × 4[5] 6 |
| 8 × 8 (scaling list index) | ScalingList 8 × 8[0] 6 | ScalingList 8 × 8[1] 7 | ScalingList 8 × 8[2] 8 | ScalingList 8 × 8[3] 9 | ScalingList 8 × 8[4] 10 | ScalingList 8 × 8[5] 11 |
| 16 × 16 (scaling list index) | ScalingList 16 × 16[0] 12 | ScalingList 16 × 16[1] 13 | ScalingList 16 × 16[2] 14 | ScalingList 16 × 16[3] 15 | ScalingList 16 × 16[4] 16 | ScalingList 16 × 16[5] 17 |
| 32 × 32 (scaling list index) | ScalingList 32 × 32[0] 18 | ScalingList 32 × 32[1] 19 | ScalingList 32 × 32[2] 20 | ScalingList 32 × 32[3] 21 | ScalingList 32 × 32[4] 22 | ScalingList 32 × 32[5] 23 |

Referring again to matrix prediction 518 of FIG. 5, for a PPS, a reference quantization matrix may be selected from any of the quantization matrices signaled in the SPS and from any of the quantization matrices already signaled in the PPS. For example, consider the example PPS format in the pseudo code of Table 13. A possible format for encoding quantization matrices is shown in lines 10-23. In this pseudo code, pic_scaling_matrix_present_flag=0 indicates that the quantization matrices specified in SPS are used. Otherwise, the quantization matrices of SPS may be overwritten by the ones encoded in the PPS. Further, pic_scaling_list_present_flag[i]=0 indicates that a corresponding quantization matrix defined in the SPS is used. Otherwise, a corresponding non-default matrix is included in the PPS which overwrites the one of the SPS. The index i is in the range of [0:23] inclusive. Scaling_list( ) ScalingList4x4, ScalingList8x8, ScalingList16x16, ScalingList32x32, qmatx_compressionID, log 2_min_transform_block_size_minus2, and log 2_diff_max_min_transform_block_size are previously defined in reference to the example SPS format of Table 11.

Similar to the SPS, in this example, if one or more non-default quantization matrices are used, then the PPS will include information for each quantization matrix, whether default or non-default, and the information will be encoded in scaling list index order (see Table 12). As this portion of the PPS is generated and a non-default quantization matrix is compressed for inclusion in the PPS, a reference quantization matrix for matrix prediction may be selected from any of the quantization matrices (default or non-default) encoded in the SPS or any of the quantization matrices (default or non-default) already encoded in the PPS, regardless of size. If the selected reference quantization matrix is smaller or larger than the quantization matrix being compressed, the reference quantization matrix is scaled up or down to the size of the size of the quantization matrix. Any suitable up-sampling technique may be used. For example, the N/2×N/2 to N×N up-sampling technique described below in reference to FIGS. 8A-8C may be used. Further, any suitable down-sampling technique may be used to scale down a reference quantization matrix. For example, a simple down-sampling technique is to construct the smaller matrix by picking every other row and column from the N×N input matrix. Any suitable criteria may be used for selection of the reference quantization matrix.

An indication of which matrix was used as the reference quantization matrix and an indication of whether the matrix is from the SPS or PPS are included in the PPS to inform the decoder. This reference matrix indicator may be, for example, the scaling list index of the matrix or the difference between the scaling list index of the quantization matrix and the scaling list index of the reference quantization matrix. The reference matrix indicator may be encoded with signed exp-Golomb code if the reference quantization matrix is selected from the SPS or unsigned exp-Golomb code if the reference quantization matrix is selected from the PPS.

Figure 7:
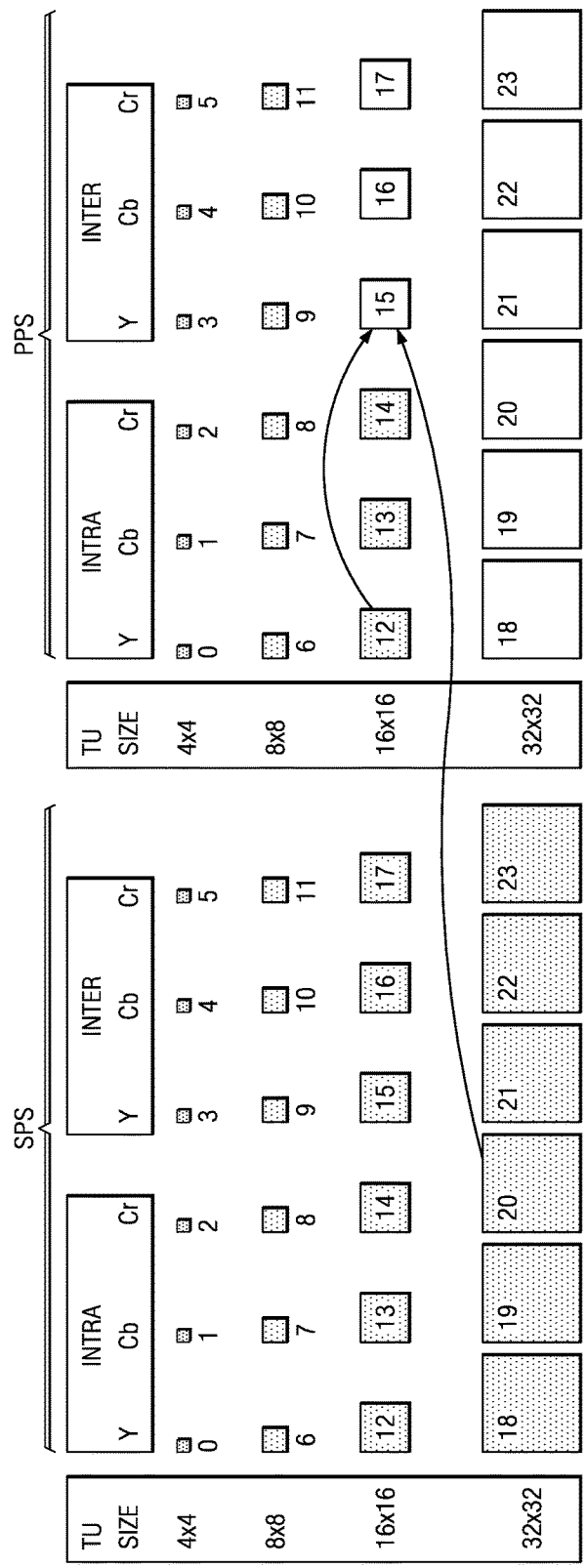

FIG. 7 shows an example of matrix prediction during generation of a PPS. Both an SPS and a PPS are depicted. Each of the blocks in this example corresponds to one of the 24 quantization matrices and the index of each matrix is in the corresponding block. The shaded blocks indicate quantization matrices already encoded in the SPS and PPS and the unshaded blocks indicate quantization matrices yet to be encoded. Thus, in this example, quantization matrices 0-23 are encoded in the SPS and quantization matrices 0-14 are already encoded in the PPS. Quantization matrix 15, which is assumed to be a non-default matrix, is the matrix currently being compressed using matrix prediction.

Any of quantization matrices 0-23 in the SPS and quantization matrices 0-14 in the PPS may be used as the reference quantization matrix for quantization matrix 15. A 1-bit flag is included in the PPS to communicate to the decoder whether the reference matrix is selected from the SPS or the PPS. As shown in this example, matrix 20 in the SPS or matrix 12 in the PPS may be selected as the reference quantization matrix for matrix 15. Thus, the reference matrix indicator included in the PPS may be 15-20=−5 coded with signed exp-Golomb code if matrix 20 in the SPS is selected and may be 15-12=3 coded with unsigned exp-Golomb code if matrix 12 in the PPS is selected.

TABLE 13

| | | Desc |
|---|---|---|
| 1 | pic_parameter_set_rbsp( ) { | |
| 2 |     pic_parameter_set_id | ue(v) |
| 3 |     seq_parameter_set_id | ue(v) |
| 4 |     entropy_coding_mode_flag | u(1) |
| 5 |     num_ref_idx_l0_default_active_minus1 | ue(v) |
| 6 |     num_ref_idx_l1_default_active_minus1 | ue(v) |
| 7 |     pic_init_qp_minus26 /* relative to 26 */ | se(v) |
| 8 |     constrained_intra_pred_flag | u(1) |
| 9 |     pic_scaling_matrix_present_flag | u(1) |
| 10 |     if( pic_scaling_matrix_present_flag ) | |
| 11 |         for( k = 0; k <= log2_diff_max_min_transform_block_size*6; k++ ) { | |
| 12 |             i = k + log2_min_transform_block_size_minus2*6 | |
| 13 |             if ((i%6) == 0) qmatx_compressionID[i/6] | u(3) |
| 14 |         pic_scaling_list_present_flag[ i ] | u(1) |
| 15 |         if( seq_scaling_list_present_flag[ i ] ) | |
| 16 |             if( i < 6 ) | |
| 17 |                 scaling_list( ScalingList4x4[ i ], 4, i, 0, qmatx_compressionID[i/6]) | |
| 18 |             else(i < 12) | |
| 19 |                 scaling_list( ScalingList8x8[ i − 6 ], 8, i, 0, qmatx_compressionID[i/6]) | |
| 20 |             else if (i < 18) | |
| 21 |                 scaling_list( ScalingList16x16[ i − 12 ], 16, i, 0, qmatx_compressionID[i/6] ) | |
| 22 |             else | |
| 23 |                 scaling_list( ScalingList32x32[ i − 18 ], 32, i, 0, qmatx_compressionID[i/6] ) | |
| 24 |     } | |
| 25 |     rbsp_trailing_bits( ) | |
| 26 | } | |

Referring again to FIG. 5, the order k of the exp-Golomb code used for coding the 1D residual sequence and whether signed or unsigned exp-Golomb was used is also communicated to the decoder. For example, a 2-bit flag may be used to signal the order of exp-Golomb code used, and a 1-bit flag may be used to signal whether signed or un-signed exp-Golomb code is used. Further, the decoder is informed as to whether 1D sample prediction or matrix prediction is used. For example, a 1-bit flag may be used to signal this choice.

Tables 14 and 15 show examples of the quantization matrix compression of FIG. 5 applied to an 8×8 quantization matrix. Both examples apply 135 degree symmetry processing and 45 degree symmetry processing and use unsigned 1D prediction with unsigned kth order exp-Golomb coding of the 1D residual sequence. The example of Table 15 also applies down-sampling.

TABLE 14

| Original 8 × 8 quantization matrix | | | | | | | | 8 × 8 zigzag scanning matrix | | | | | | | |
|---|---|---|---|---|---|---|---|---|---|---|---|---|---|---|---|
| 8, | 11, | 23, | 26, | 50, | 53, | 89, | 92, | 0, | 1, | 5, | 6, | 14, | 15, | 27, | 28, |
| 11, | 20, | 29, | 47, | 56, | 86, | 95, | 134, | 2, | 4, | 7, | 13, | 16, | 26, | 29, | 42, |
| 23, | 29, | 44, | 59, | 83, | 98, | 131, | 137, | 3, | 8, | 12, | 17, | 25, | 30, | 41, | 43, |
| 26, | 47, | 59, | 80, | 101, | 128, | 140, | 167, | 9, | 11, | 18, | 24, | 31, | 40, | 44, | 53, |
| 50, | 56, | 83, | 101, | 125, | 143, | 164, | 170, | 10, | 19, | 23, | 32, | 39, | 45, | 52, | 54, |
| 53, | 86, | 98, | 128, | 143, | 161, | 173, | 188, | 20, | 22, | 33, | 38, | 46, | 51, | 55, | 60, |
| 89, | 95, | 131, | 140, | 164, | 173, | 185, | 191, | 21, | 34, | 37, | 47, | 50, | 56, | 59, | 61, |

TABLE 14-continued

| 92, | 134, | 137, | 167, | 170, | 188, | 191, | 197, | 35, | 36, | 48, | 49, | 57, | 58, | 62, | 63, |

| After 135 degree symmetry processing | After 45 degree symmetry processing |
|---|---|

| 8, | 11, | 23, | 26, | 50, | 53, | 89, | 92, | 8, | 11, | 23, | 26, | 50, | 53, | 89, | 92, |
|---|---|---|---|---|---|---|---|---|---|---|---|---|---|---|---|
| 0, | 20, | 29, | 47, | 56, | 86, | 95, | 134, | 0, | 20, | 29, | 47, | 56, | 86, | 95, | 0, |
| 0, | 0, | 44, | 59, | 83, | 98, | 131, | 137, | 0, | 0, | 44, | 59, | 83, | 98, | 0, | 0, |
| 0, | 0, | 0, | 80, | 101, | 128, | 140, | 167, | 0, | 0, | 0, | 80, | 101, | 0, | 0, | 0, |
| 0, | 0, | 0, | 0, | 125, | 143, | 164, | 170, | 0, | 0, | 0, | 0, | 0, | 0, | 0, | 0, |
| 0, | 0, | 0, | 0, | 0, | 161, | 173, | 188, | 0, | 0, | 0, | 0, | 0, | 0, | 0, | 0, |
| 0, | 0, | 0, | 0, | 0, | 0, | 185, | 191, | 0, | 0, | 0, | 0, | 0, | 0, | 0, | 0, |
| 0, | 0, | 0, | 0, | 0, | 0, | 0, | 197, | 0, | 0, | 0, | 0, | 0, | 0, | 0, | 0, |

| After zigzag scanning | After 1-D prediction: residual sequence |
|---|---|

| 8, | 11, | 0, | 0, | 20, | 23, | 26, | 29, | 8, | 3, | 9, | 3, | 3, | 3, | 15, | 3, |
|---|---|---|---|---|---|---|---|---|---|---|---|---|---|---|---|
| 0, | 0, | 0, | 0, | 44, | 47, | 50, | 53, | 3, | 3, | 3, | 3, | 21, | 3, | 3, | 3, |
| 56, | 59, | 0, | 0, | 0, | 0, | 0, | 0, | 3, | 3, | 3, | 3, | | | | |
| 80, | 83, | 86, | 89, | 92, | 95, | 98, | 101, | | | | | | | | |
| 0, | 0, | 0, | 0, | 0, | 0, | 0, | 0, | | | | | | | | |
| 0, | 0, | 0, | 0, | 0, | 0, | 0, | 0, | | | | | | | | |
| 0, | 0, | 0, | 0, | 0, | 0, | 0, | 0, | | | | | | | | |
| 0, | 0, | 0, | 0, | 0, | 0, | 0, | 0, | | | | | | | | |

| Error of reconstructed quantization matrix (Qsum = 205) | Reconstructed quantization matrix (Qsum = 205) |
|---|---|

| 0, | 0, | 0, | 0, | 0, | 0, | 0, | 0, | 8, | 11, | 23, | 26, | 50, | 53, | 89, | 92, |
|---|---|---|---|---|---|---|---|---|---|---|---|---|---|---|---|
| 0, | 0, | 0, | 0, | 0, | 0, | 0, | 18, | 11, | 20, | 29, | 47, | 56, | 86, | 95, | 116, |
| 0, | 0, | 0, | 0, | 0, | 0, | 12, | −15, | 23, | 29, | 44, | 59, | 83, | 98, | 119, | 152, |
| 0, | 0, | 0, | 0, | 0, | 6, | −9, | 12, | 26, | 47, | 59, | 80, | 101, | 122, | 149, | 155, |
| 0, | 0, | 0, | 0, | 0, | −3, | 6, | −9, | 50, | 56, | 83, | 101, | 125, | 146, | 158, | 179, |
| 0, | 0, | 0, | 6, | −3, | 0, | −3, | 6, | 53, | 86, | 98, | 122, | 146, | 161, | 176, | 182, |
| 0, | 0, | 12, | −9, | 6, | −3, | 0, | −3, | 89, | 95, | 119, | 149, | 158, | 176, | 185, | 194, |
| 0, | 18, | −15, | 12, | −9, | 6, | −3, | 0, | 92, | 116, | 152, | 155, | 179, | 182, | 194, | 197, |

TABLE 15

| Original 8 × 8 quantization matrix | Down-sampled 5 × 5 quantization matrix |
|---|---|

| 8, | 11, | 23, | 26, | 50, | 53, | 89, | 92, | 8, | 11, | 26, | 53, | 92, |
|---|---|---|---|---|---|---|---|---|---|---|---|---|
| 11, | 20, | 29, | 47, | 56, | 86, | 95, | 134, | 11, | 20, | 47, | 86, | 134, |
| 23, | 29, | 44, | 59, | 83, | 98, | 131, | 137, | 26, | 47, | 80, | 128, | 167, |
| 26, | 47, | 59, | 80, | 101, | 128, | 140, | 167, | 53, | 86, | 128, | 161, | 188, |
| 50, | 56, | 83, | 101, | 125, | 143, | 164, | 170, | 92, | 134, | 167, | 188, | 197, |
| 53, | 86, | 98, | 128, | 143, | 161, | 173, | 188, | | | | | |
| 89, | 95, | 131, | 140, | 164, | 173, | 185, | 191, | | | | | |
| 92, | 134, | 137, | 167, | 170, | 188, | 191, | 197, | | | | | |

| 5 × 5 zigzag scanning matrix | After 135 and 45 degree symmetry processing (step 2) plus step 3)) |
|---|---|

| 0, | 1, | 5, | 6, | 14, | 8, | 11, | 26, | 53, | 92, |
|---|---|---|---|---|---|---|---|---|---|
| 2, | 4, | 7, | 13, | 15, | 0, | 20, | 47, | 86, | 0, |
| 3, | 8, | 12, | 16, | 21, | 0, | 0, | 80, | 0, | 0, |
| 9, | 11, | 17, | 20, | 22, | 0, | 0, | 0, | 0, | 0, |
| 10, | 18, | 19, | 23, | 24, | 0, | 0, | 0, | 0, | 0, |

| After zigzag scanning | After 1-D prediction: residual sequence |
|---|---|

| 8, | 11, | 0, | 0, | 20, | 8, | 3, | 9, | 6, | 27, | 0, | 27, | 6, | 6, |
|---|---|---|---|---|---|---|---|---|---|---|---|---|---|
| 26, | 53, | 47, | 0, | 0, | | | | | | | | | |
| 0, | 0, | 80, | 86, | 92, | | | | | | | | | |
| 0, | 0, | 0, | 0, | 0, | | | | | | | | | |
| 0, | 0, | 0, | 0, | 0, | | | | | | | | | |

| Reconstructed 5 × 5 quantization matrix (Qsum = 205) | Reconstructed 8 × 8 quantization matrix after up-sampling (Qsum = 205) |
|---|---|

| 8, | 11, | 26, | 53, | 92, | 8, | 11, | 19, | 26, | 40, | 53, | 73, | 92, |
|---|---|---|---|---|---|---|---|---|---|---|---|---|
| 11, | 20, | 53, | 86, | 152, | 11, | 20, | 34, | 47, | 67, | 86, | 110, | 134, |
| 26, | 53, | 80, | 152, | 179, | 19, | 34, | 49, | 64, | 86, | 107, | 129, | 151, |

TABLE 15-continued

| | | | | | | | | | | | | |
|---|---|---|---|---|---|---|---|---|---|---|---|---|
| 53, | 86, | 152, | 185, | 194, | | 26, | 47, | 64, | 80, | 104, | 128, | 148, | 167, |
| 92, | 152, | 179, | 194, | 197, | | 40, | 67, | 86, | 104, | 125, | 145, | 162, | 178, |
| | | | | | | 53, | 86, | 107, | 128, | 145, | 161, | 175, | 188, |
| | | | | | | 73, | 110, | 129, | 148, | 162, | 175, | 184, | 193, |
| | | | | | | 92, | 134, | 151, | 167, | 178, | 188, | 193, | 197, |

Table 16 summarizes experimental results of applying the compression method of FIG. 5 with various options selected to compress the example quantization matrices of Tables 2-5. In Table 16, level 0 compression includes only zigzag scanning, signed 1D prediction, and signed kth order exp-Golomb coding. Level 1 adds 135 degree symmetry processing in addition to the processing of level 0. Level 2 adds 45 degree symmetry processing in addition to the processing of levels 0 and 1. Level 3 compression includes both 135 and 45 degree symmetry processing and both signed 1D prediction and unsigned 1D prediction are enabled. Level 4 compression includes all processing options except matrix prediction. As shown in Table 16, the application of 135 degree symmetry (level 1) provides about 2× compression over level 0 and the compression ratio goes up to roughly 4× when 135 degree symmetry, 45 degree symmetry, and both signed and unsigned 1D prediction are enabled (level 3). The compression ratio goes over 7× if the down-sampling is also enabled (level 4).

TABLE 16

| Quantization matrix block size | H.264 # of bits | Level 0 # of bits | Level 1 # of bits | Level 2 # of bits | Level 3 # of bits | Level 4 # of bits |
|---|---|---|---|---|---|---|
| 4 × 4 | 140 | 118 | 80 | 62 | 48 | 38 |
| 8 × 8 | 344 | 298 | 178 | 114 | 82 | 55 |
| 16 × 16 | 702 | 704 | 356 | 206 | 182 | 102 |
| 32 × 32 | 1578 | 1580 | 866 | 467 | 430 | 185 |
| Total | 2764 | 2700 | 1480 | 849 | 742 | 380 |
| Compression ratio | | 1.02 | 1.87 | 3.26 | 3.73 | 7.27 |

If the quantization matrix is down-sampled for compression, up-sampling is needed for decompression of the matrix. Any suitable up-sampling technique may be used. Table 17 is example pseudo code for one possible up-sampling technique. Note that this up-sampling technique is normative.

TABLE 17

```
upSampleMatx(N, deciQmatx, Qmatx){
// horizontal bilinear matrix up-sampling
 for (i=0; i< N/2 +1 ; i++) {
  if (i > 1) row = i*2 −1; else row = i;
   for (j=0; j<N; j++) {
    if (j >1 & ((j&0x1) ==0) ) {
     Qmatx[row*N+j] =
      (deciQmatx[i*(N/2+1)+j/2+1] +
      deciQmatx[i*(N/2+1)+j/2] + 1)>>1;
    } else {
     if (j < 2)
      Qmatx[row*N+ j] = deciQmatx[i*(N/2+1)+j];
     else
      Qmatx[row*N+j] = deciQmatx[i*(N/2+1)+j/2+1]; }}}
// vertical bilinear matrix up-sampling
 for (i=2; i< N ; i+=2)
  for (j=0; j<N; j++) {
   Qmatx[i*N+j] = (Qmatx[(i−1)*N+j] + Qmatx[(i+1)*N+j] +1 )>>1;}}
```

Figure 8A:
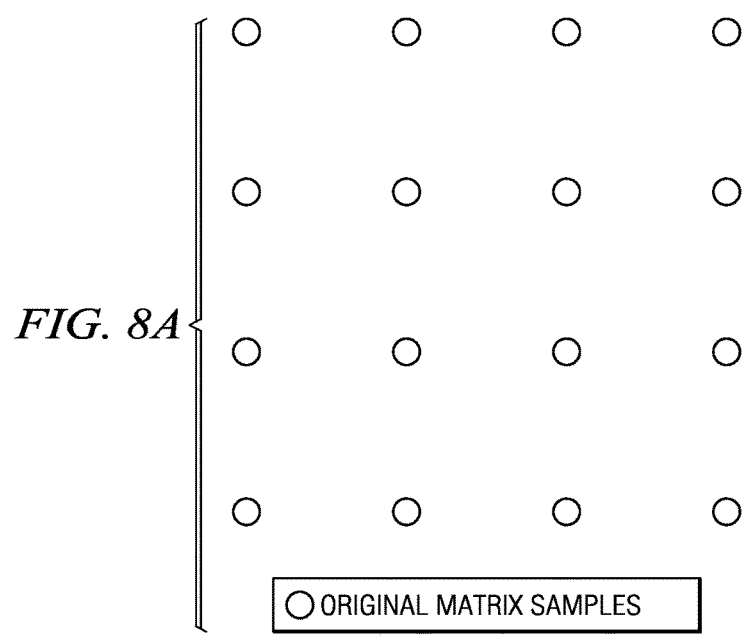
Figure 8B:
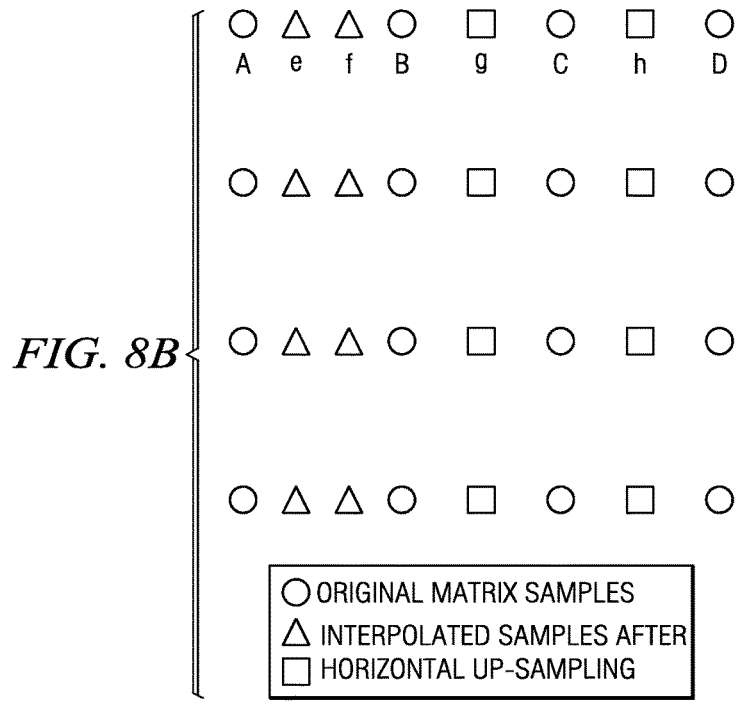
Figure 8C:
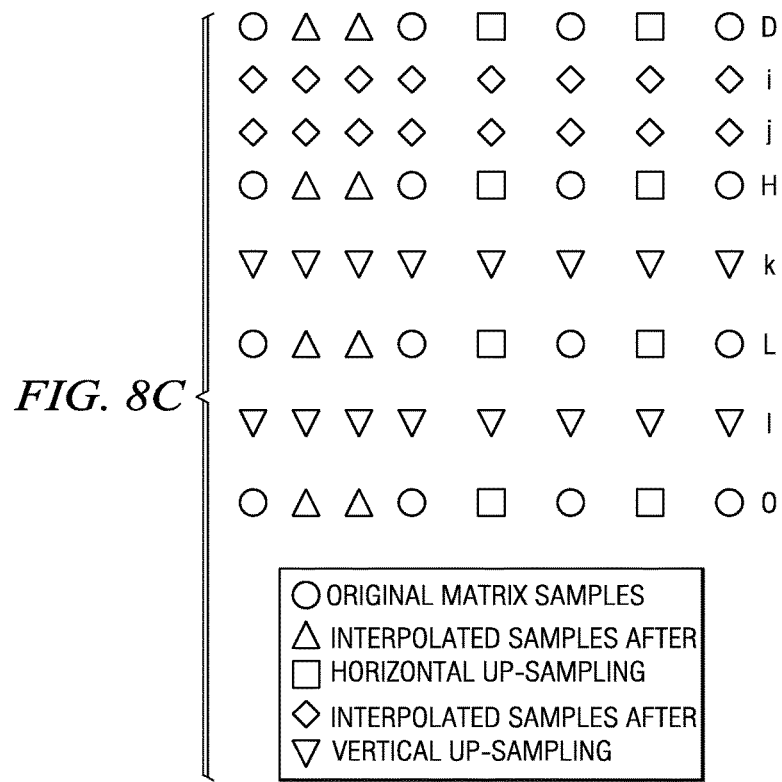

As was previously discussed, a reference quantization matrix may need to be up-sampled either in a video encoder or a video decoder. FIGS. 8A-8C show an example of an N/2×N/2 to N×N up-sampling technique that may be used. In this example, FIG. 8A is the original matrix, FIG. 8B is the matrix after horizontal up-sampling, and FIG. 8C is the matrix after vertical up-sampling. Further, horizontal up-sampling is performed before vertical up-sampling, and the following bilinear interpolation technique is used:

$$\begin{cases} e = (21*A + 11*B + 16) >> 5 \\ f = (11*A + 21*B + 16) >> 5 \\ g = (B + C + 1) >> 1 \\ h = (C + D + 1) >> 1 \end{cases}$$

where A, B, C, and D are sample values of a row in the original quantization matrix and e, f, g, and h are interpolated samples after the horizontal matrix up-sampling. As shown in FIG. 8B, in each row of the original quantization matrix (FIG. 8A), two samples, i.e., e and f, are interpolated between the first two samples, and a single sample, i.e., g and h, is interpolated each of the following pairs of samples using bilinear interpolation. The same process is applied to each row of the original matrix.

The vertical matrix up-sampling follows similar bilinear interpolation rules:

$$\begin{cases} i = (21*D + 11*H + 16) >> 5 \\ j = (11*D + 21*H + 16) >> 5 \\ k = (H + L + 1) >> 1 \\ l = (L + O + 1) >> 1 \end{cases}$$

where D, H, L, and O are sample values of a column in the quantization matrix after horizontal up-sampling and i, j, k, and l are interpolated samples after the vertical matrix up-sampling. As shown in FIG. 8C, in each column of the quantization matrix after horizontal up-sampling (FIG. 8B), two samples, i.e., i and j, are interpolated between the first two samples, and a single sample, i.e., k and l, is interpolated between of the following pairs of samples using bilinear interpolation. The same process is applied to each matrix column.

Application of this up-sampling process one time up-samples an N×N quantization matrix to a 2N×2N quantization matrix, e.g., from 8×8 to 16×16. If an N×N quantization matrix needs to be up-sampled to 4N×4N e.g., from 8×8 to 32×32, the above up-sampling process may be applied twice, e.g., for up-sampling an 8×8 matrix to a 32×32 matrix, the 8×8 matrix is first up-sampled to 16×16 and then resulting 16×16 matrix is up-sampled to create the 32×32 matrix. In general, by applying the above quantization matrix up-sampling process n times, an N×N matrix can be up-sampled to a $(2^n \times N) \times (2^n \times N)$ matrix. Vertical up-sampling may also be performed before horizontal up-sampling.

Figure 9A:
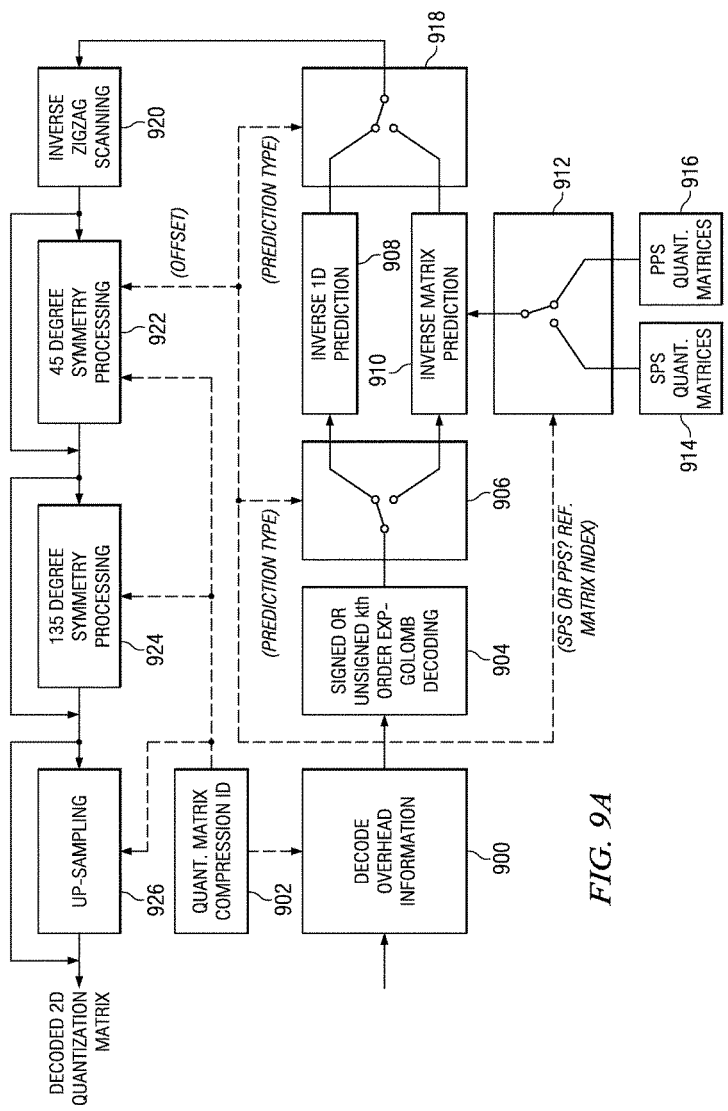
FIGS. 9A and 9B are flow diagrams of methods for quantization matrix decompression.

FIG. 9A shows a flow diagram of a method for decompressing a quantization matrix in a video decoder. In general, the decompression operates to reverse the compression method performed by the video encoder to reconstruct the quantization matrix. An embodiment of the method may be performed, for example, by the quantization matrix decompression component 401 of FIG. 4. The input to the method is a compressed quantization matrix, the quantization matrix compression ID, e.g., qmatx_compressionID of Tables 11 and 13, and the other overhead information previously described.

Initially, the overhead information for the compressed quantization matrix is decoded 900. The overhead information decoded may include a 2-bit flag which signals the order of signed or un-signed exp-Golomb code used in compressing the quantization matrix, a 1-bit flag which signals whether signed or unsigned exp-Golomb code was used for residual coding, the offset for the 45 degree symmetry processing (if used), and a 1-bit prediction type flag which signals whether 1D prediction or matrix prediction was used. If the compressed quantization matrix is in the SPS and matrix prediction was used for the compressed quantization matrix, unsigned exp-Golomb code is used to decode a reference matrix indicator identifying the reference quantization matrix used for the matrix prediction. If the compressed quantization matrix is in a PPS and matrix prediction was used for the compressed quantization matrix, unsigned exp-Golomb code is used to decode a reference matrix indicator identifying the reference quantization matrix used for the matrix prediction, a 1-bit flag is decoded which indicates whether the reference matrix is from the SPS or the PPS, and a reference matrix indicator is decoded. This indicator is decoded using signed exp-Golomb code if the 1-bit flag indicates the matrix is from the SPS and is decoded using unsigned exp-Golomb code if the 1-bit flag indicates the matrix is from the PPS.

After decoding of the overhead information, signed or unsigned kth order exp-Golomb decoding is applied to the compressed quantization matrix to reconstruct the 1D residual sequence 904. The value of k and whether signed or unsigned exp-Golomb coding is to be used is determined from the decoded overhead information.

After the 1D residual sequence is reconstructed, either inverse 1D prediction 908 or inverse matrix prediction 910 is selected 906 based on the decoded prediction type flag. Inverse matrix prediction 908 reverses the signed or unsigned 1D prediction performed when compressing the quantization matrix to reconstruct the 1D sequence. Inverse matrix prediction 910 reverses the matrix prediction performed when compressing the quantization matrix to reconstruct the 1D sequence. The appropriate reference matrix is selected 912 from the SPS quantization matrices 914 or the PPS quantization matrices 916 based on the decoded overhead information.

The reconstructed 1D sequence from inverse 1D prediction 908 or inverse matrix prediction 910 is then selected 918 for inverse zigzag scanning 920. The inverse zigzag scanning 920 reverses the zigzag scanning performed when compressing the quantization matrix to reconstruct the quantization matrix. 45 degree symmetry processing 922, 135 degree symmetry processing 924, and/or up-sampling 926 may then be applied to the reconstructed quantization matrix to generate the decoded 2D quantization matrix. The value of the quantization matrix compression ID determines which, if any, of these are to be applied.

Figure 9B:
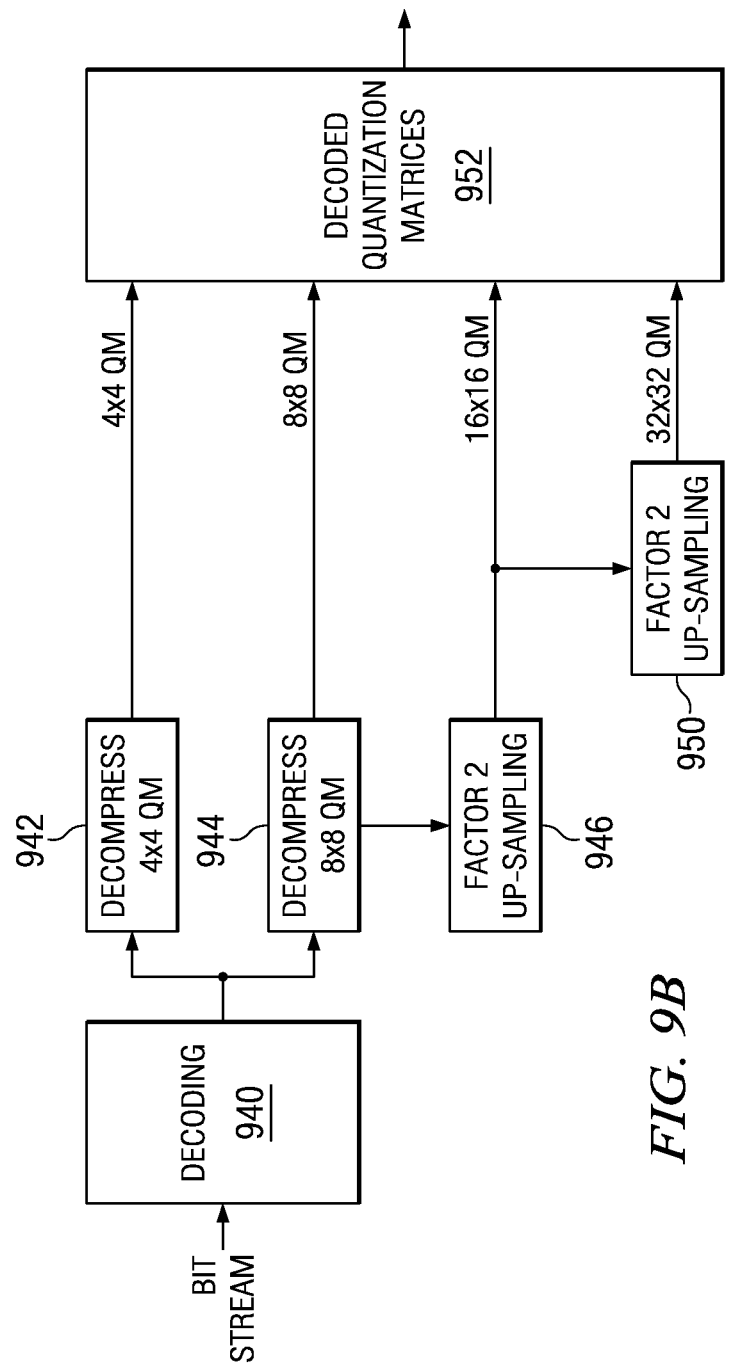

FIG. 9B shows a flow diagram of a method for decompressing a quantization matrix in a video decoder. This method assumes that non-default 4×4 and 8×8 quantization matrices are compressed by the video encoder and signaled in the compressed bit stream. The compression of the 4×4 and 8×8 quantization matrices may be performed as previously described herein or may be performed using any other suitable compression technique. An embodiment of the method may be performed, for example, by the quantization matrix decompression component 401 of FIG. 4.

Initially, the compressed bit stream is decoded 940. If a compressed 4×4 quantization matrix is found in the compressed bit stream, the quantization matrix is decompressed 942 and output 952. Similarly, if a compressed 8×8 quantization matrix is found in the compressed bit stream, the quantization matrix is decompressed 944 and output 952. Factor 2 up-sampling 946 is then performed on the 8×8 reconstructed quantization matrix to generate a 16×16 reconstructed quantization matrix. Factor 2 up-sampling 950 is then performed on the 16×16 reconstructed quantization matrix to generate a 32×32 reconstructed quantization matrix that is then output 952. Any suitable technique may be used for the up-sampling. One suitable technique is previously described herein in reference to FIGS. 8A-8C. Note that the up-sampled matrices are automatically generated when an 8×8 compressed quantization matrix is received, and that the up-sampled quantization matrices are of the same type, i.e., Y, Cr, Cb, intra or inter, as the 8×8 quantization matrix.

Figure 10:
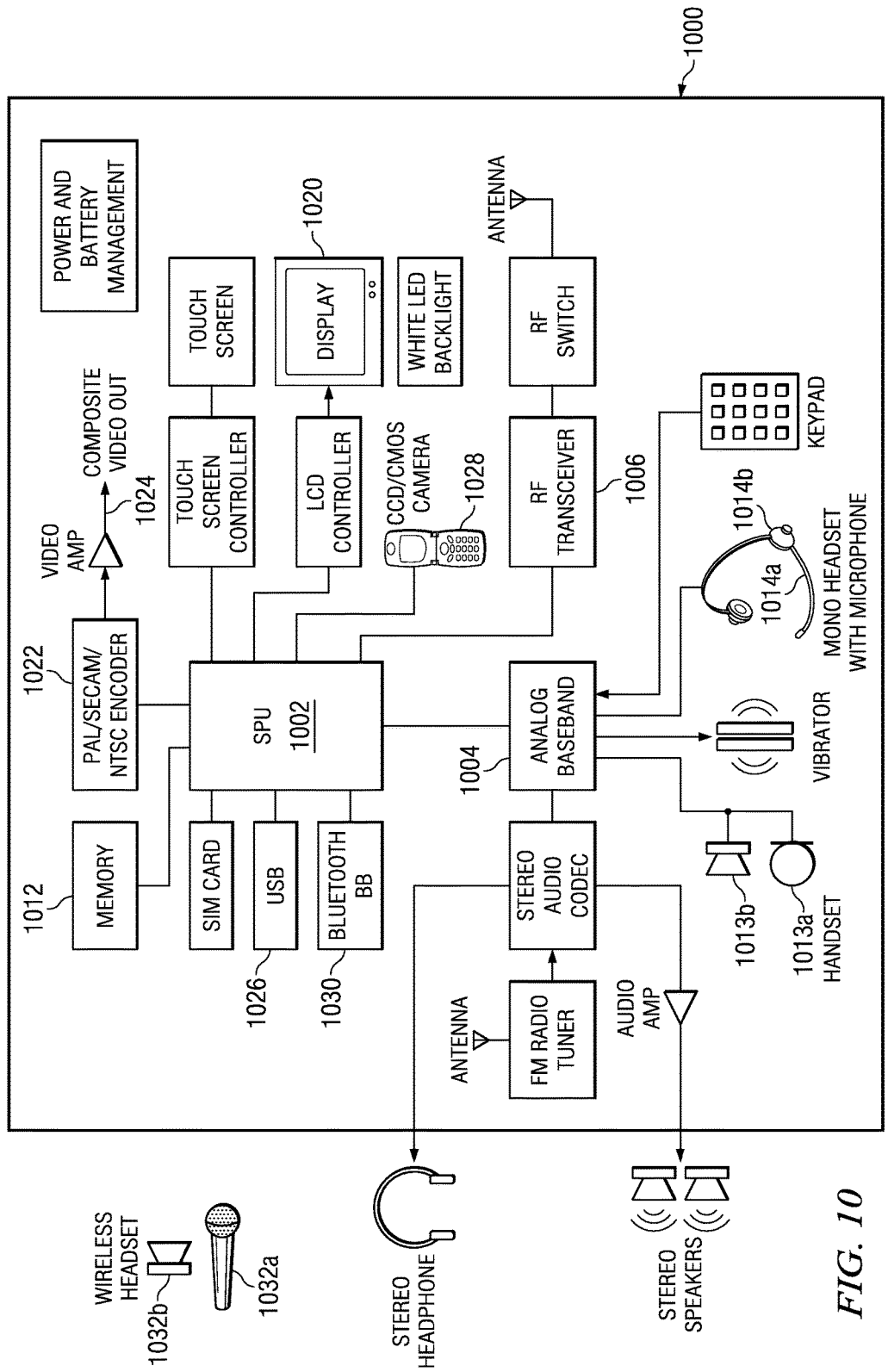
FIG. 10 is a block diagram of an illustrative digital system.

Embodiments of the methods, encoders, and decoders described herein may be implemented for virtually any type of digital system (e.g., a desk top computer, a laptop computer, a handheld device such as a mobile (i.e., cellular) phone, a personal digital assistant, a digital camera, etc.). FIG. 10 is a block diagram of a digital system 1000 (e.g., a mobile cellular telephone) that may be configured to use techniques described herein.

As shown in FIG. 10, the signal processing unit (SPU) 1002 includes a digital signal processing system (DSP) that includes embedded memory and security features. The analog baseband unit 1004 receives a voice data stream from the handset microphone 1013a and sends a voice data stream to the handset mono speaker 1013b. The analog baseband unit 1004 also receives a voice data stream from the microphone 1014a or 1032a and sends a voice data stream to the mono headset 1014b or wireless headset 1032b. The analog baseband unit 1004 and the SPU 1002 may be separate ICs. In many embodiments, the analog baseband unit 1004 does not embed a programmable processor core, but performs processing based on configuration of audio paths, filters, gains, etc being setup by software running on the SPU 1002.

The display 1020 may display pictures and video sequences received from a local camera 1028, or from other sources such as the USB 1026 or the memory 1012. The SPU 1002 may also send a video sequence to the display 1020 that is received from various sources such as the cellular network via the RF transceiver 1006 or the Bluetooth interface 1030. The SPU 1002 may also send a video sequence to an external video display unit via the encoder unit 1022 over a composite output terminal 1024. The encoder unit 1022 may provide encoding according to PAL/SECAM/NTSC video standards.

The SPU 1002 includes functionality to perform the computational operations required for video encoding and decoding. In one or more embodiments, the SPU 1002 is configured to perform computational operations for applying one or more techniques for quantization matrix compression and decompression during the encoding process as described herein. Software instructions implementing all or part of the techniques may be stored in the memory 1012 and executed by the SPU 1002, for example, as part of encoding video sequences captured by the local camera 1028. The SPU 1002 is also configured to perform computational operations for applying one or more techniques for quantization matrix decompression as described herein as part of decoding a received coded video sequence or decoding a coded video sequence stored in the memory 1012. Software instructions implementing all or part of the techniques may be stored in the memory 1012 and executed by the SPU 1002.

Other Embodiments

While the invention has been described with respect to a limited number of embodiments, those skilled in the art, having benefit of this disclosure, will appreciate that other embodiments can be devised which do not depart from the scope of the invention as disclosed herein. For example, in some embodiments, rather than compressing large quantization matrices, e.g., 16×16 and 32×32 matrices, the video encoder may select a previously signaled smaller quantization matrix, e.g., a 4×4 or 8×8 matrix, as a reference matrix for the larger matrix and signal in an SPS or PPS that the larger quantization matrix is to be reconstructed by up-sampling the smaller reference quantization matrix. The derivation of the larger matrices may be performed using any suitable technique, such as up-sampling, interpolation, prediction, or any combination thereof. For example, the up-sampling technique of FIGS. 8A-8C may be used.

In another example, more or fewer quantization matrix sizes and/or different quantization matrix sizes may be used.

In another example, rather than compressing quantization matrices for the chroma components Cr and Cb, these quantization matrices may be derived from a Y component quantization matrix or vice versa.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of processing video, comprising:
    dividing a picture into a plurality of non-over-lapping blocks comprising residual pixel values;
    transforming the residual pixel values of the plurality of non-over-lapping blocks into transform coefficients using a transform operation;
    encoding a first flag into an encoded bit stream indicating a default quantization matrix or a non-default quantization matrix;
    determine a second index position where the non-default quantization matrix at a first index position will use;
    quantizing the transform coefficients into quantized transform coefficients using the non-default quantization matrix at the second index position and encoding a relationship between the first and second index position into the encoded video bit stream; and
    encoding the quantized transform coefficients into the encoded video bit stream.

2. The method of claim 1 further comprising scanning the non-default matrix in a one dimensional sequence for the non-default matrix and encoding the one dimensional sequence for the non-default matrix into the encoded video bit stream.

3. The method of claim 1 wherein the encoded video bit stream is part of a sequence parameter set (SPS) or a picture parameter set (PPS).

4. The method of claim 2 wherein the encoded video bit stream is part of a sequence parameter set (SPS) or a picture parameter set (PPS).

5. The method claim 1 wherein the relationship between the first and second index position is a difference.

6. The method claim 2 wherein the relationship between the first and second index position is a difference.

7. The method of claim 4 wherein the relationship between the first and second index position is a difference.

8. The method of claim 1 where the relationship between the first and second index position is encoded using a Golomb code.

9. The method of claim 6 where the difference is encoded using a Golomb code.

10. The method of claim 1 further comprising capturing the picture using a charge coupled device (CCD) camera or a complementary metal oxide semiconductor (CMOS) camera.

11. A method of decoding an encoded video bit stream, comprising:
    entropy decoding the encoded video bit stream resulting in a plurality of decoded video bits comprising a plurality of quantized transform coefficients;
    extracting a first flag from the decoded bit stream indicating a non-default quantization matrix;
    extracting a second flag from the decoded bit stream indicating a relationship between a first and second index position where the non-default quantization matrix will be implemented;
    performing an inverse quantization operation on the plurality of quantized transform coefficients using the non-default quantization matrix at either the first or second index position resulting in a plurality of transform coefficients; and
    performing an inverse transform operation on the plurality of transform coefficients to form a plurality of reconstructed non-over-lapping blocks.

12. The method of claim 11 further comprising recovering the non-default quantization matrix a first portion of the entropy decoded video bit stream.

13. The method of claim 12 wherein the first portion of the entropy decoded bit stream is for sequence parameter sets (SPS).

14. The method of claim 12 wherein the first portion of the entropy decoded bit stream is for picture parameter sets (PPS).

15. The method of claim 11 wherein the relationship is a difference.

16. The method of claim 15 wherein the non-default quantization matrix is an 4×4 matrix, an 8×8 matrix or a 16×16 matrix.

17. The method of claim 15 further comprising forming a frame using the plurality of reconstructed non-over-lapping blocks and displaying the frame on a display.

* * * * *